United States Patent [19]
Kuhn et al.

[11] Patent Number: 5,814,691
[45] Date of Patent: *Sep. 29, 1998

[54] STABILIZED POLYVINYL CHLORIDE

[75] Inventors: Karl Josef Kuhn, Lautertal; Wolfgang Wehner, Ober-Ramstadt, both of Germany

[73] Assignee: Ciba Specialty Chemicals Corporation, Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 566,772

[22] Filed: Dec. 4, 1995

[51] Int. Cl.⁶ .................................. C08K 5/34; C08K 5/04
[52] U.S. Cl. .......................... 524/102; 524/399; 524/424
[58] Field of Search .................... 524/102, 399, 524/424

[56] References Cited

U.S. PATENT DOCUMENTS

| | | | |
|---|---|---|---|
| 493,608 | 10/1893 | Kunieda et al. | 524/394 |
| 5,194,470 | 3/1993 | Carette et al. | 524/178 |

FOREIGN PATENT DOCUMENTS

| | | |
|---|---|---|
| 0286887 | 10/1988 | European Pat. Off. . |
| 0362012 | 4/1990 | European Pat. Off. . |
| 0453380 | 10/1991 | European Pat. Off. . |
| 63304 | 4/1995 | Ireland . |
| 2213154 | 8/1989 | United Kingdom . |

*Primary Examiner*—Kriellion Morgan
*Attorney, Agent, or Firm*—Luther A. R. Hall; Victoria M. Malia

[57] ABSTRACT

The invention relates to a PVC composition comprising a stabilizer combination of (b) polyDHP of the formula I

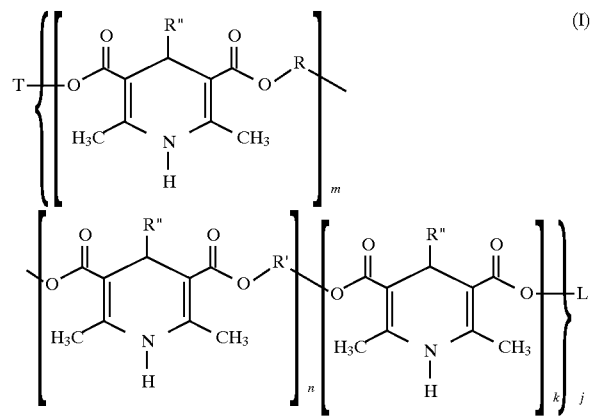

where the radicals T, L, R, R', R" are as defined in claim 1,
(c) a substance from the group consisting of
 crystalline hydrotalcites,
 crystalline or amorphous zeolites,
 crystalline or amorphous dawsonites, magadiites or kenyaites, disaccharide alcohols and
 sterically hindered amines containing the structural unit

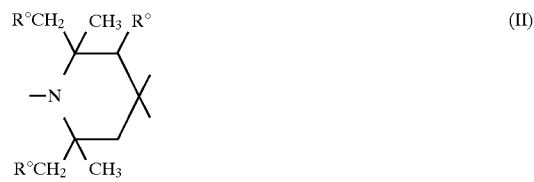

in which R° is hydrogen or methyl, and
(d) at least one zinc, aluminium or lanthanoid compound.

11 Claims, No Drawings

STABILIZED POLYVINYL CHLORIDE

The invention relates to PVC (polyvinyl chloride) containing polyDHP (polydihydropyridine) compounds of the formula I, at least one substance from the group consisting of hydrotalcites, dawsonites, magadiites, kenyaites, zeolites, disaccharide alcohols and sterically hindered amines, and at least one zinc, aluminium or lanthanoid compound, to a process for the preparation thereof, and to the use thereof.

PVC can be stabilized by a number of additives. Compounds of lead and cadmium are particularly suitable for this purpose, but are contentious today for ecological reasons owing to the heavy-metal content (cf. "Plastics Additives", Editors R. Gächter and H. Müller, Hanser Verlag, 3rd Edition, 1990, pages 287–295 and Kunststoff-Handbuch PVC [Plastics Handbook PVC], Volumes 1 and 2, Beck/Braun, Carl Hanser Verlag).

The search is therefore continuing for effective stabilizers and stabilizer combinations.

PolyDHP of the formula I shown below is known as a stabilizer for PVC. EP-B-0 286 887 describes such compounds as heat stabilizers for, in particular, rigid PVC mixtures containing, as further stabilizers, a lubricant, epoxidized soybean oil, zinc and calcium soaps, and organic costabilizers.

It has now been found that PVC stabilized by a mixture of a polyDHP of the formula I, at least one substance from the group consisting of hydrotalcites, dawsonites, magadiites, kenyaites, zeolites, disaccharide alcohols and sterically hindered amines, and at least one zinc, aluminium or lanthanoid compound has excellent thermal stability with very good colour retention. It is particularly noteworthy that excellent paste stability and light stability are achieved.

The invention relates to a compound comprising
(a) PVC
(b) at least one polyDHP compound of the formula I

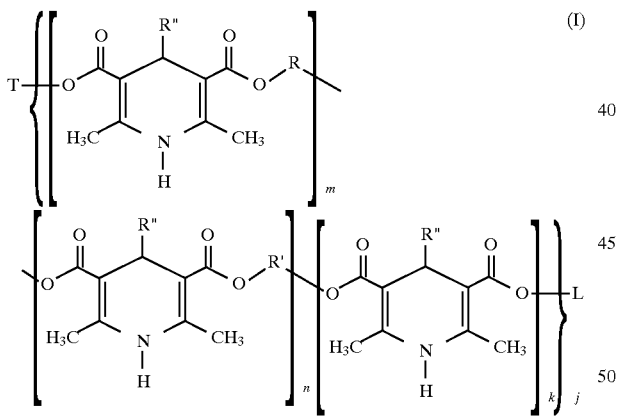

in which T is $C_1$–$C_{22}$alkyl which is unsubstituted or substituted by $C_1$–$C_{18}$alkoxy,
$C_1$–$C_{18}$alkylthio, hydroxyl, acryloyloxy, methacryloyloxy, halogen, phenyl or naphthyl;
$C_5$–$C_{10}$aryl, which may also be heterocyclic and is unsubstituted or substituted by $C_1$–$C_{18}$alkyl, $C_1$–$C_{18}$alkoxy or halogen;
$C_3$–$C_{10}$alkenyl, $CH_3$—CO—$CH_2$—CO—OR—, $CH_3$—CO—$CH_2$—COO—R',
$CH_3$—C(NR'''$_2$)=CH-COOR—or $CH_3$—C(NR'''$_2$)=CHCO—O R'—,
L is as defined for T or is a trivalent or polyvalent radical formed from a straight-chain or branched alkyl group which is unsubstituted or substituted by $C_1$–$C_{12}$alkoxy,
$C_1$–$C_{12}$thioalkoxy, $C_6$–$C_{10}$aryl, $C_1$–$C_{12}$carboxyl or hydroxyl,
m and n are numbers from 0 to 20,
k is 0 or 1,
j is a number from 1 to 6 and the conditions j (k+m+n)>1 and m+n>0 are fulfilled,
R and R', independently of one another, are methylene or phenylene or an alkylene group of the -(-$C_pH_{2p}$-X-)$_t$ $C_pH_{2p}$- type which is unsubstituted or carries substituents from the series consisting of $C_1$–$C_{12}$alkoxy, $C_1$–$C_{12}$thioalkoxy, $C_6$–$C_{10}$aryl, $C_1$–$C_{12}$carboxyl and hydroxyl,
p is from 2 to 18,
t is from 0 to 10,
X is oxygen or sulfur
or, if k is 0 and j >1, R and R', together with L, are a direct bond,
R" is hydrogen or $C_6$–$C_{10}$aryl, $C_2$–$C_{18}$alkoxycarbonyl or $C_1$–$C_{18}$alkyl which is unsubstituted or substituted by one or more $C_1$–$C_{12}$alkyl, $C_1$–$C_8$alkoxy, halogen or $NO_2$ substituents,
and the two R''' are identical or different and are hydrogen, $C_1$–$C_{18}$alkyl,
$C_1$–$C_{18}$hydroxyalkyl or $C_1$–$C_{18}$alkoxyalkyl or together are $C_3$–$C_5$alkylene which is uninterrupted or interrupted by O,
or are straight-chain or branched $C_2$–$C_{22}$alkenyl,
(c) at least one substance from the group consisting of
crystalline hydrotalcites,
crystalline or amorphous zeolites,
crystalline or amorphous dawsonites, magadiites or kenyaites,
disaccharide alcohols and
sterically hindered amines containing the structural unit

in which R° is hydrogen or methyl, and
(d) at least one zinc, aluminium or lanthanoid compound.

Any $C_1$–$C_{18}$alkyl or $C_1$–$C_{22}$alkyl radicals in the above formula I are branched or unbranched, cyclic or acyclic radicals. Examples thereof are methyl, ethyl, propyl, isopropyl, n-butyl, isobutyl, t-butyl, pentyl, cyclopentyl, isopentyl, hexyl, cyclohexyl, heptyl, 3-heptyl, octyl, cyclooctyl, 2-ethylhexyl, nonyl, decyl, undecyl, dodecyl, cyclododecyl, tridecyl, tetradecyl, pentadecyl, hexadecyl, heptadecyl, octadecyl, eicosyl, 2-ethylbutyl, 1-methylpentyl, 1,3-dimethylbutyl, 1,1,3,3-tetramethylbutyl, 1-methylhexyl, isoheptyl, 1-methylheptyl, 1,1,3-trimethylhexyl or 1-methylundecyl; these radicals preferably have 1–12 carbon atoms, in particular 1–8 carbon atoms.

Further alkyl groups in above formulae have the same illustrative meanings apart from the corresponding number of carbon atoms. Alkoxy and thioalkoxy or alkylthio radicals are derived from such alkyl groups by in each case adding an oxygen or sulfur atom to the O-alkyl or S-alkyl group.

$C_3$–$C_{10}$alkenyl can be branched or unbranched and is, for example, allyl, 2-methallyl, hexenyl or octenyl. $C_2$–$C_{22}$Alkenyl can likewise be branched or unbranched and can additionally be, for example, undecenyl, heptadecenyl or oleyl.

Any halogen substituents in the formula I are taken to be fluorine, chlorine, bromine or iodine, in particular F, Cl or Br, especially Cl.

Cyclic alkyl radicals preferably have 5 to 12 carbon atoms in the ring and carry, if desired, 1 to 3 alkyl substituents, preferably methyl or ethyl groups. Preference is given by cyclopentyl and cyclohexyl, in particular cyclohexyl.

$C_6-C_{10}$aryl is, for example, phenyl or α- or β-naphthyl, each of which is unsubstituted or substituted by halogen or $C_1-C_4$alkyl.

$C_5-C_{10}$aryl, which may be heterocyclic, can be, for example, pyrryl, phenyl, naphthyl, pyridyl, morpholinyl, furyl, thiazolyl or indolyl.

Examples of $C_2-C_{12}$carboxyl radicals are derived from carboxylic acids as described in detail below under carboxylates (metal soaps).

Component (a) is taken to mean PVC in the broader sense, i.e. including blends, copolymers and graft polymers of PVC with polymerizable compounds, such as acrylonitrile, vinyl acetate or ABS; the PVC can be a suspension, bulk or emulsion polymer or a mixture thereof. Preference is given to PVC as a suspension, emulsion or bulk polymer, also in combination with polyacrylates.

Component (b) is preferably at least one compound of the formula I in which T and L, independently of one another, are $C_1-C_{18}$alkyl, m, k and j are 1, n is 0, R is —$(CH_2)_2$—, $(CH_2)_4$ or —$(CH_2)_2$—S—$(CH_2)_2$—, and R" is hydrogen. The polyDHP compounds of the formula I can expediently be present in the compositions in an amount of from 0.001 to 5 parts by weight, preferably from 0.01 to 0.5 part by weight, based on 100 parts by weight of PVC.

Component (c):

Suitable compounds from the series consisting of the hydrotalcits, zeolites, dawsonites, magadiites and kenyaites are both naturally occurring minerals and synthetic compounds.

Compounds from the series consisting of the hydrotalcites can be described by the general formula III $$M^{2+}_{1-x}.M^{3+}_x.(OH)_2.(A^{b-})_{x/b}.dH_2O \qquad (III)$$

where $M^{2+}$ is Mg, Ca, Sr, Zn, Sn and/or Ni, $M^{3+}$ is Al, B or Bi, $A^{b-}$ is an anion having the valence b, b is a number from 1 to 4, x is a number from 0 to 0.5, and d is a number from 0 to 2.

$A^{b-}$ is preferably OH⁻, Cl⁻, Br⁻, I⁻, $ClO_4^-$, $HCO_3^-$, $CH_3COO^-$, $C_6H_5COO^-$, $CO_3^{2-}$, $SO_4^{2-}$,

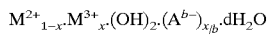

$(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$; further examples are given in DE 4 106 403.

Other hydrotalcites which can preferably be used are compounds having the general formula IIIa $$M_v^{2+}Al_2(OH)_{2v+6bz}(A^{b-})_2sH_2O. \qquad (IIIa)$$

where $M^{2+}$ is at least one metal from the series consisting of Mg and Zn, $A^{b-}$ is an anion from the series consisting of

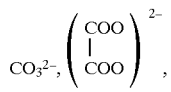

OH⁻ and $S^{2-}$, where b is the valence of the anion, s is a positive number, preferably from 0.5 to 5, v is from 2 to 6 and z is less than 2.

Preference is given to compounds from the series consisting of the hydrotalcites of the general formula III $$M^{2+}_{1-x}.M^{3+}_x.(OH)_2.(A^{b-})_{x/b}.dH_2O \qquad (III)$$

where $M^{2+}$ is Mg or a solid solution of Mg and Zn, $A^{b-}$ is $CO_3^{2-}$, x is a number from 0 to 0.5, and d is a number from 0 to 2.

Very particular preference is given to hydrotalcites of the formulae $Al_2O_3.6MgO.CO_2.12H_2O$, $Mg_{4.5}Al_2(OH)_{13}.CO_3.3.5H_2O$, $4MgO.Al_2O_3.CO_2.9H_2O$, $4MgO.Al_2O_3.CO_2.6H_2O$, $ZnO.3MgO.Al_2O_3.CO_2.8-9H_2O$ or $ZnO.3MgO.Al_2O_3.CO_2.5-6H_2O$.

The hydrotalcites can be used in an amount of, for example, from 0.1 to 20 parts by weight, preferably from 0.1 to 10 parts by weight, in particular from 0.1 to 5 parts by weight, based on 100 parts by weight of PVC.

Zeolites can be described by the general formula (X)

$$M_{q/a}[(AlO_2)_q(SiO_2)_r].wH_2O \qquad (X)$$

where a is the charge of the cation M,

M is an element from the first or second main group, or zinc, q:r is a number between 0.8 and infinity, preferably between 0.8 and 10.5, and w is a number between 0 and 300.

Furthermore, zeolites which can be used according to the invention are disclosed in "Atlas of Zeolite Structure Types", W. M. Meier and D. H. Olson, Butterworths, 3rd Edition, 1992.

Zeolites in the broader sense also include aluminium phosphates having a zeolite structure.

The preferred zeolites which are known per se have an average effective pore diameter of 3–5 Å and can be prepared by known methods. Particular preference is given to zeolites of the type NaA which have an average effective pore diameter of 4 Å, and are therefore known as zeolites 4A.

Particular preference is given to crystalline sodium aluminosilicates whose particle size is at least predominantly in the range from 1 to 10 μm.

Preference is given to zeolites of the formulae $Na_{12}Al_{12}Si_{12}O_{48}.27H_2O$[zeolite A], $Na_6Al_6Si_6O_{24}.2NaX.7.5H_2O$, X=OH,halogen,$ClO_4$[sodalite]

$Na_6Al_6Si_{30}O_{72}.24H_2O$, $Na_8Al_8Si_{40}O_{96}.24H_2O$,

Na$_{16}$Al$_{16}$Si$_{24}$O$_{80}$.16H$_2$O,

Na$_{16}$Al$_{16}$Si$_{32}$O$_{96}$.16H$_2$O,

Na$_{56}$Al$_{56}$Si$_{136}$O$_{384}$.250H$_2$O,[zeolite Y]

Na$_{86}$Al$_{86}$Si$_{106}$O$_{384}$.264H$_2$O[zeolite X]

and the zeolites which can be prepared by replacement of all or some of the sodium atoms by lithium, potassium, magnesium, calcium, strontium or zinc atoms, such as (Na,K)$_{10}$Al$_{10}$Si$_{22}$O$_{64}$.20H$_2$O.

Ca$_{4.5}$Na$_3$[(AlO$_2$)$_{12}$(SiO$_2$)$_{12}$].30H$_2$O

K$_9$Na$_3$[(AlO$_2$)$_{12}$(SiO$_2$)$_{12}$].27H$_2$O.

The zeolites can be used in an amount of, for example, from 0.1 to 20 parts by weight, preferably from 0.1 to 10 parts by weight, in particular from 0.1 to 5 parts by weight, based on 100 parts by weight of PVC.

Dawsonites are taken to mean aluminocarbonates of the formula Na(or K or Li)[Al(OH)$_2$CO$_3$].n H$_2$O, where n is a number from 0 to 30. They can be added to the PVC in the same amounts as the zeolites.

Magadiites are taken to mean compounds of the formula Na$_2$Si$_{14}$O$_{29}$.n H$_2$O or Na$_2$Si$_8$O$_{17}$.n H$_2$O, where n is a number from 0 to 30. They can be added to the PVC in the same amounts as the zeolites.

Kenyaites are taken to mean compounds of the formula Na$_2$Si$_{22}$O$_{45}$.n H$_2$O, where n is a number from 0 to 30. They can be added to the PVC in the same amounts as the zeolites.

Disaccharide alcohols can be described by the formula C$_6$H$_{11}$O$_6$.C$_6$H$_{13}$O$_5$. Examples of disaccharide alcohols are maltitol, malbitol, lactitol, palatinol, isomaltitol, isomaltol, leucrose, dihydroleucrose, glucopyranosylsorbitol, glucopyranosylmannitol and lycasine (dehydrated). Very particular preference is given to maltitol, lactitol, isomaltitol and palatinol. They can be added to the PVC in the same amounts as the zeolites.

Sterically hindered amines are compounds from the series consisting of derivatives of polyalkylpiperidines containing at least one structural unit of the formula II; the polyalkylpiperidinyl groups of the formula II are preferably substituted in the 4-position by one or two polar substituents or a polar spiro ring system.

Particular preference is given to polymer compositions as described above wherein the polyalkylpiperidine derivative is a derivative of 2,2,6,6-tetramethylpiperidine (R°=H in the formula II).

Of importance are in particular the following classes of polyalkylpiperidines which carry at least one group of the formula II, as mentioned above:

(a) compounds of the formula IV

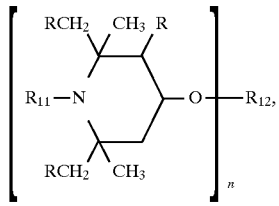

in which n is a number from 1 to 4, preferably 1 or 2, R is hydrogen or methyl, R$_{11}$ is hydrogen, N-oxide, hydroxyl, C$_1$–C$_{12}$alkyl, C$_3$–C$_8$alkenyl, C$_3$–C$_8$alkynyl, C$_7$–C$_{12}$aralkyl, C$_1$–C$_{18}$alkoxy, C$_5$–C$_8$cycloalkoxy, C$_7$C$_9$phenylalkoxy, C$_1$–C$_8$alkanoyl, C$_3$–C$_5$alkenoyl, C$_1$–C$_{18}$alkanoyloxy, benzoxy, glycidyl or a group —CH$_2$CH(OH)—Z, in which Z is hydrogen, methyl or phenyl, where R$_{11}$ is preferably H, C$_1$–C$_4$alkyl, allyl, benzyl, acetyl or acryloyl, and R$_{12}$, in the case where n is 1, is hydrogen, C$_1$–C$_{18}$alkyl which may be interrupted by one or more oxygen atoms, cyanoethyl, benzyl, glycidyl, a monovalent radical of an aliphatic, cycloaliphatic, araliphatic, unsaturated or aromatic carboxylic acid, carbamic acid, or phosphorus-containing acid, or a monovalent silyl radical, preferably a radical of an aliphatic carboxylic acid having 2 to 18 C atoms, of a cycloaliphatic carboxylic acid having 7 to 15 C atoms, of an α,β-unsaturated carboxylic acid having 3 to 5 C atoms or of an aromatic carboxylic acid having 7 to 15 C atoms, R$_{12}$, in the case where n is 2, is C$_2$–C$_{12}$alkylene, C$_4$–C$_{12}$alkenylene, xylylene, a divalent radical of an aliphatic, cycloaliphatic, araliphatic or aromatic dicarboxylic acid, dicarbamic acid, or phosphorus-containing acid, or a divalent silyl radical, preferably a radical of an aliphatic dicarboxylic acid having 2 to 36 C atoms, of a cycloaliphatic or aromatic dicarboxylic acid having 8–14 C atoms or of an aliphatic, cycloaliphatic or aromatic dicarbamic acid having 8–14 C atoms, R$_{12}$ is, in the case where n is 3, a trivalent radical of an aliphatic, cycloaliphatic or aromatic tricarboxylicacid, of an aromatic tricarbamic acid or of a phosphorus-containing acid, or a trivalent silyl radical, and R$_{12}$ is, in the case where n is 4, a tetravalent radical of an aliphatic, cycloaliphatic or aromatic tetracarboxylic acid.

Any C$_1$–C$_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of R$_{11}$ or R$_{12}$ as C$_1$–C$_{18}$alkyl are the groups listed above and in addition, for example, n-tridecyl, n-tetradecyl, n-hexadecyl and n-octadecyl.

Examples of R$_{11}$ as C$_3$–C$_8$alkenyl are 1-propenyl, allyl, methallyl, 2-butenyl, 2-pentenyl, 2-hexenyl, 2-octenyl and 4-tert-butyl-2-butenyl.

R$_{11}$ as C$_3$–C$_8$alkynyl is preferably propargyl.

R$_{11}$ as C$_7$–C$_{12}$aralkyl is in particular phenethyl and especially benzyl.

Examples of R$_{11}$ as C$_1$–C$_8$alkanoyl are formyl, propionyl, butyryl, octanoyl, but preferably acetyl and as C$_3$–C$_5$alkenoyl in particular acryloyl.

R$_{12}$ as a monovalent radical of a carboxylic acid is, for example, an acetic acid, caproic acid, stearic acid, acrylic acid, methacrylic acid, benzoic acid or β-(3,5-di-tert-butyl-4-hydroxyphenyl)propionic acid radical.

R$_{12}$ as a divalent radical of a dicarboxylic acid is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid radical.

R$_{12}$ as a trivalent radical of a tricarboxylic acid is, for example, a trimellitic acid, citric acid or nitrilotriacetic acid radical.

R$_{12}$ as a tetravalent radical of a tetracarboxylic acid is, for example, the tetravalent radical of butane-1,2,3,4-tetracarboxylic acid or of pyromellitic acid.

R$_{12}$ as a divalent radical of a dicarbamic acid is, for example, a hexamethylenedicarbamic acid or a 2,4-toluylenedicarbamic acid radical.

Preference is given to compounds of the formula IV in which R is hydrogen, R$_{11}$ is hydrogen or methyl, n is 2, and R$_{12}$ is the diacyl radical of an aliphatic dicarboxylic acid having 4–12 C atoms.

Examples of polyalkylpiperidine compounds of this class are the following compounds:
1) 4-hydroxy-2,2,6,6-tetramethylpiperidine 2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl-β-(3,5-di-tert-butyl-4-hydroxyphenyl)propionate
9) di(1-benzyl-2,2,6,6-tetramethylpiperidin-4-yl) maleate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethylpiperidin-4-yl) sebacate
16) di(1-allyl-2,2,6,6-tetramethylpiperidin-4-yl) phthalate
17) 1-hydroxy-4-β-cyanoethyloxy-2,2,6,6-tetramethylpiperidine
18) 1-acetyl-2,2,6,6-tetramethylpiperidin-4-yl acetate
19) trimellitic acid tri(2,2,6,6-tetramethylpiperidin-4-yl) ester
20) 1-acryloyl-4-benzyloxy-2,2,6,6-tetramethylpiperidine
21) di(2,2,6,6-tetramethylpiperidin-4-yl) diethylmalonate
22) di(1,2,2,6,6-pentamethylpiperidin-4-yl) dibutylmalonate
23) di(1,2,2,6,6-pentamethylpiperidin-4-yl) butyl(3,5-di-tert-butyl-4-hydroxybenzyl) malonate
24) di(1-octyloxy-2,2,6,6-tetramethylpiperidin-4-yl) sebacate
25) di(1-cyclohexyloxy-2,2,6,6-tetramethylpiperidin-4-yl) sebacate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-tetramethylpiperidin-4-oxy)silane
30) tris(1-propyl-2,2,6,6-tetramethylpiperidin-4-yl) phosphite
31) tris(1-propyl-2,2,6,6-tetramethylpiperidin-4-yl) phosphate
32) bis(1,2,2,6,6-pentamethylpiperidin-4-yl) phenylphosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine (b) compounds of the formula (V)

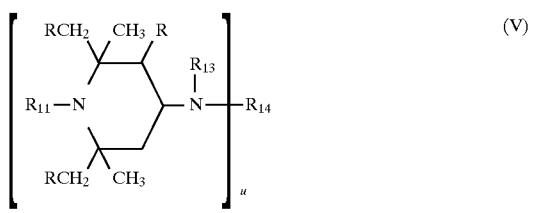

in which n is 1 or 2, R and $R_{11}$ are as defined under (a)

$R_{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl, benzoyl or a group of the formula

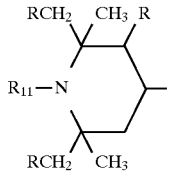

and $R_{14}$, in the case where n is 1, is hydrogen, $C_1$–$C_8$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group, or is glycidyl, a group of the formula —$CH_2$—$CH(OH)$—Z or of the formula —CONH—Z, in which Z is hydrogen, methyl or phenyl;

$R_{14}$, in the case where n is 2, is $C_2$–$C_{12}$alkylene, $C_6$–$C_{12}$arylene, xylylene, a —$CH_2$—$CH(OH)$—$CH_2$— group or a —$CH_2$—$CH(OH)$—$CH_2$—O—Y—O— group, in which Y is $C_2$–$C_{10}$alkylene, $C_6$–$C_{15}$arylene, $C_6$–$C_{12}$cycloalkylene, or, provided $R_{13}$ is not alkanoyl, alkenoyl or benzoyl, $R_{14}$ can also be a divalent radical of an aliphatic, cycloaliphatic or aromatic dicarboxylic acid or dicarbamic acid or the group —CO—, or, in the case where n is 1, $R_{13}$ and R14 together can be the divalent radical of an aliphatic, cycloaliphatic or aromatic 1,2- or 1,3-dicarboxylic acid.

Any $C_1$–$C_{12}$alkyl or $C_1$$C_{18}$alkyl substituents present are as already defined under (a).

Any $C_5$–$C_7$cycloalkyl substitutents present are in particular cyclohexyl.

$R_{13}$ as $C_7$–$C_8$aralkyl is in particular phenylethyl or especially benzyl. $R_{13}$ as $C_2$–$C_5$hydroxyalkyl is in particular 2-hydroxyethyl or 2-hydroxypropyl.

Examples of $R_{13}$ as $C_2$–$C_{18}$alkanoyl are propionyl, butyryl, octanoyl, dodecanoyl, hexadecanoyl, octadecanoyl, but preferably acetyl and, as $C_3$–$C_5$alkenoyl, in particular acryloyl.

Examples of $R_{14}$ as $C_2$–$C_8$alkenyl are allyl, methallyl, 2-butenyl, 2-pentenyl, 2-hexenyl and 2-octenyl.

Examples of $R_{14}$ as $C_1$–$C_4$alkyl substituted by a hydroxyl, cyano, alkoxycarbonyl or carbamide group are 2-hydroxyethyl, 2-hydroxypropyl, 2-cyanoethyl, methoxycarbonylmethyl, 2-ethoxycarbonylethyl, 2-aminocarbonylpropyl and 2-(dimethylaminocarbonyl)ethyl.

Any $C_2$–$C_{12}$alkylene substituents present are, for example, ethylene, propylene, 2,2-dimethylpropylene, tetramethylene, hexamethylene, octamethylene, decamethylene or dodecamethylene.

Any $C_6$–$C_{15}$arylene substituents present are, for example, o-, m- or p-phenylene, 1,4-naphthylene or 4,4'-diphenylene.

$C_6$–$C_{12}$cycloalkylene is in particular cyclohexylene.

Preference is given to compounds of the formula V in which n is 1 or 2, R is hydrogen, $R_{11}$ is hydrogen or methyl, $R_{13}$ is hydrogen, $C_1$–$C_{12}$alkyl or a group of the formula

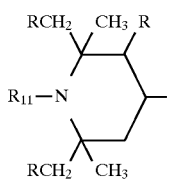

and $R_{14}$, in the case where n is 1, is hydrogen or $C_1$–$C_{12}$alkyl, and, in the case where n is 2, is $C_2$–$C_8$alkylene. Examples of polyalkylpiperidine compounds of this class are the following compounds:

37) N,N'-bis(2,2,6,6-tetramethylpiperidin-4-yl)hexamethylene-1,6-diamine
38) N,N'-bis(2,2,6,6-tetramethylpiperidin-4-yl)hexamethylene-1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylendiamine
44) N,N'-bis(2,2,6,6-tetramethylpiperidin-4-yl)succinediamide
45) di(2,2,6,6-tetramethylpiperidin-4-yl) N-(2,2,6,6-tetramethylpiperidin-4-yl)-β-aminodipropionate
46) the compound of the formula

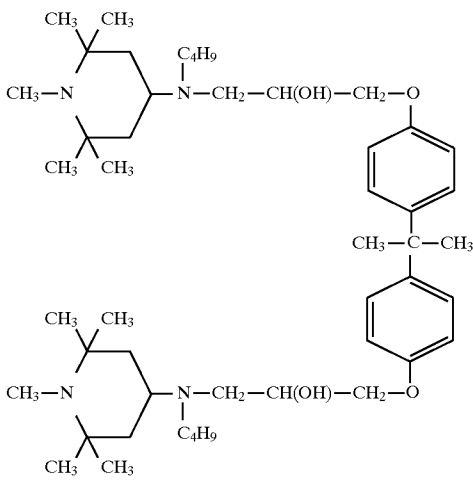

47) 4-[bis(2-hydroxyethyl)amino]-1,2,2,6,6-pentamethylpiperidine
48) 4-(3-methyl-4-hydroxy-5-tert-butylbenzamido)-2,2,6,6-tetramethylpiperidine
49) 4-methacrylamido-1,2,2,6,6-pentamethylpiperidine (c) compounds of the formula (VI)

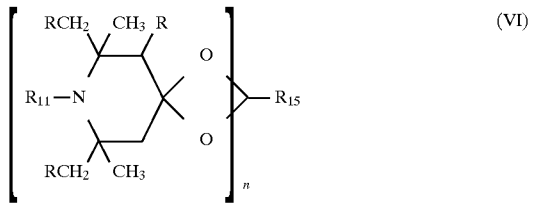

in which n is 1 or 2, R and $R_{11}$ are as defined under (a), and $R_{15}$, in the case where n is 1, is $C_2$–$C_8$alkylene or -hydroxyalkylene or $C_4$–$C_{22}$acyloxyalkylene, and, in the case where n is 2, is the group (—$CH_2$)$_2$C($CH_2$—)$_2$.

Examples of $R_{15}$ as $C_2$–$C_8$alkylene or -hydroxyalkylene are ethylene, 1-methylethylene, propylene, 2-ethylpropylene and 2-ethyl-2-hydroxymethylpropylene.

An example of $R_{15}$ as $C_4$–$C_{22}$acyloxyalkylene is 2-ethyl-2-acetoxymethylpropylene.

Examples of polyalkylpiperidine compounds of this class are the following compounds:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetranethyl-1,5-dioxaspiro[5.5]-undecane
55) 2,2,6,6-tetramethylpiperidine-4-spiro-2'-(1',3'-dioxane)-5'-spiro-5"-(1",3"-dioxane)-2"-spiro-4"'-(2"',2"',6"',6"'-tetramethylpiperidine).

(d) Compounds of the formulae VIIA, VIIB and VIIC, compounds of the formula VIIA being preferred,

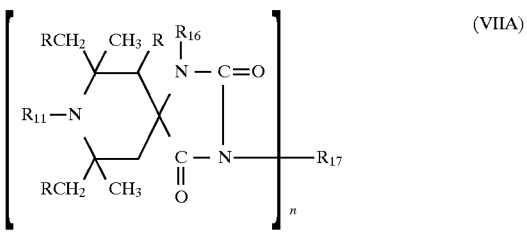

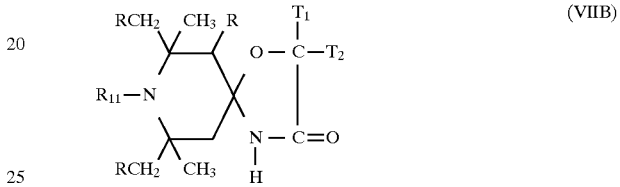

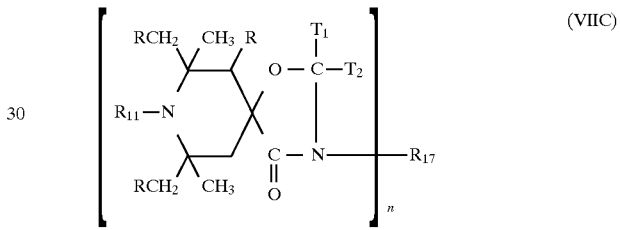

in which n is 1 or 2, R and $R_{11}$ are as defined under (a), $R_{16}$ is hydrogen, $C_1$–$C_{12}$alkyl, allyl, benzyl, glycidyl or $C_2$–$C_6$alkoxyalkyl and $R_{17}$, in the case where n is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —($CH_2$)$_p$—COO—Q or of the formula —($CH_2$)$_p$—O—CO—Q, in which p is 1 or 2 and Q is $C_1$–$C_4$alkyl or phenyl, $R_{17}$, in the case where n is 2, is $C_2$–$C_{12}$alkylene, $C_4$–$C_{12}$alkenylene, $C_6$–$C_{12}$ arylene, a —$CH_2$—CH(OH)—$CH_2$—O—Y—O—$CH_2$—CH(OH)—$CH_2$—group, in which Y is $C_2$–$C_{10}$alkylene, $C_6$–$C_{15}$arylene, $C_6$–$C_{12}$ cycloalkylene, or a —$CH_2$CH(OZ')$CH_2$—(O$CH_2$—CH(OZ')$CH_2$)$_2$—group, in which Z' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or $C_6$–$C_{10}$aryl or $C_7$–$C_9$aralkyl, each of which is unsubstituted or substituted by halogen or $C_1$–$C_4$alkyl, or $T_1$ and $T_2$ together with the C atom linking them form a $C_5$–$C_{14}$cycloalkane ring.

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents present can be, for example, the groups listed above and in addition, for example, n-tridecyl, n-tetradecyl, n-hexadecyl or n-octadecyl.

Any $C_2$–$C_6$alkoxyalkyl substituents present are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Examples of $R_{17}$ as $C_3$–$C_5$alkenyl are 1-propenyl, allyl, methallyl, 2-butenyl and 2-pentenyl.

$R_{17}$, $T_1$ and $T_2$ as $C_7$–$C_9$aralkyl are in particular phenethyl or especially benzyl. A cycloalkane ring formed by $T_1$ and $T_2$ together with the C atom can be, for example, a cyclopentane, cyclohexane, cyclooctane or cyclododecane ring.

Examples of $R_{17}$ as $C_2$–$C_4$hydroxyalkyl are 2-hydroxyethyl, 2-hydroxypropyl, 2-hydroxybutyl and 4-hydroxybutyl.

$R_{17}$, $T_1$ and $T_2$ as $C_6$–$C_{10}$aryl are in particular phenyl, or α- or β-naphthyl, each of which is unsubstituted or substituted by halogen or $C_1$–$C_4$alkyl.

Examples of $R_{17}$ as $C_2$–$C_{12}$alkylene are ethylene, propylene, 2,2-dimethylpropylene, tetramethylene, hexamethylene, octamethylene, decamethylene and dodecamethylene.

$R_{17}$ as $C_4$–$C_{12}$alkenylene is in particular 2-butenylene, 2-pentenylene or 3-hexenylene.

Examples of $R_{17}$ as $C_6$–$C_{12}$arylene are o-, m- and p-phenylene, 1,4-naphthylene and 4,4'-diphenylene.

Examples of Z' as $C_2$–$C_{12}$alkanoyl are propionyl, butyryl, octanoyl, dodecanoyl, but preferably acetyl.

Y as $C_2$–$C_{10}$alkylene, $C_6$–$C_{15}$arylene or $C_6$–$C_{12}$cycloalkylene is as defined under (b).

Examples of polyalkylpiperidine compounds of this class are the following compounds:
56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro-[4.5]decane
62) 2,2-dibutyl-7,7,9,9-tetramethyl-1-oxa-3,8-diaza-4-oxospiro-[4.5]decane
63) 2,2,4,4-tetramethyl-7-oxa-3,20-diaza-21-oxodispiro [5.1.11.2]heneicosane
64) 2-butyl-7,7,9,9-tetramethyl-1-oxa-4,8-diaza-3-oxospiro [4.5]decane and preferably:
65) 8-acetyl-3-dodecyl-1,3,8-triaza-7,7,9,9-tetramethylspiro [4.5]decane-2,4-dione or the compounds of the following formulae:

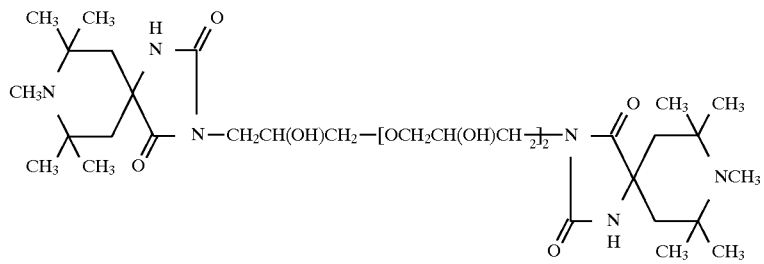

66)

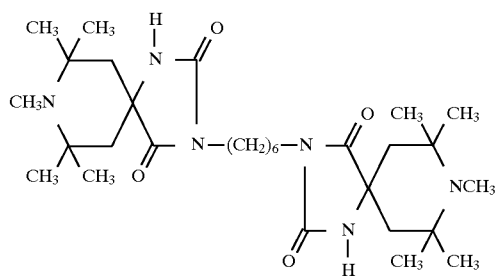

67)

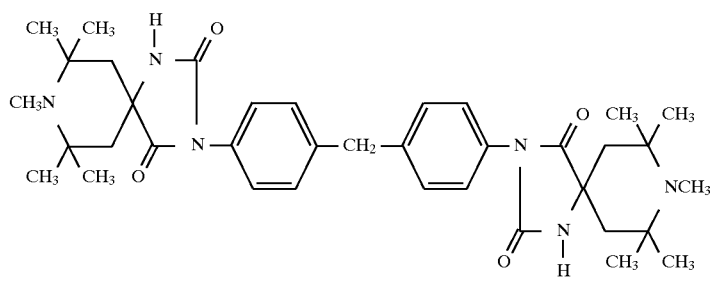

68)

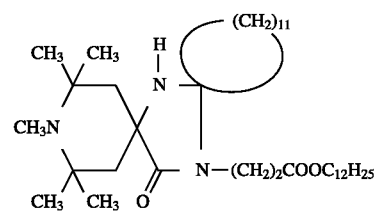

69)

(e) compounds of the formula VIII, which are themselves preferred,

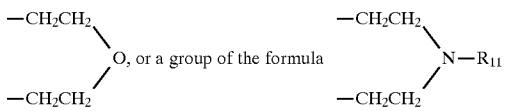
(VIII)

in which n is 1 or 2 and $R_{18}$ is a group of the formula

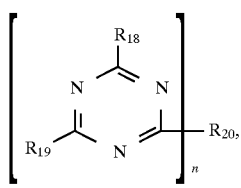

in which R and $R_{11}$ are as defined under (a),

E is —O— or —$NR_{11}$—,

A is $C_2$–$C_6$alkylene or —$(CH_2)_3$—O— and x is 0 or 1, $R_{19}$ is identical to $R_{18}$ or is one of the groups —$NR_{21}R_{22}$, —$OR_{23}$, —$NHCH_2OR_{23}$ or —$N(CH_2O\ R_{23})_2$, $R_{20}$, in the case where n is 1, is identical to $R_{18}$ or $R_{19}$ and, if n is 2, is a -E-G-E- group, in which G is $C_2$–$C_6$alkylene which may be interrupted by —$N(R_2)$—, $R_{21}$ is $C_1$–$C_{12}$alkyl, cyclohexyl, benzyl or $C_1$–$C_4$hydroxyalkyl or a group of the formula

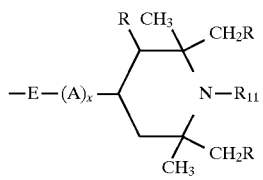

$R_{22}$ is $C_1$–$C_{12}$alkyl, cyclohexyl, benzyl, $C_1$–$C_4$hydroxyalkyl, and

70)

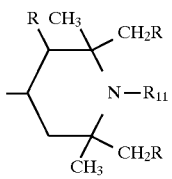

$R_{23}$ is hydrogen, $C_1$–$C_{12}$alkyl or phenyl, or $R_{21}$ and $R_{22}$ together are $C_4$–$C_5$alkylene or -oxaalkylen, for example —CH₂CH₂   —CH₂CH₂
       \              \
        O, or a group of the formula   N—$R_{11}$
       /              /
—CH₂CH₂   —CH₂CH₂ or $R_{21}$ and $R_{22}$ are each a group of the formula

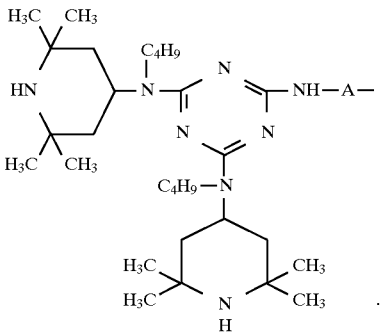

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents present are, for example, 2-hydroxyethyl, 2-hydroxypropyl, 3-hydroxypropyl, 2-hydroxybutyl or 4-hydroxybutyl.

Examples of A as $C_2$–$C_6$alkylene are ethylene, propylene, 2,2-dimethylpropylene, tetramethylene and hexamethylene.

Examples of $R_{21}$ and $R_{22}$ together as $C_4$–$C_5$alkylene or -oxaalkylene are tetramethylene, pentamethylene and 3-oxapentamethylene.

Examples of polyalkylpiperidine compounds of this class are the compounds of the following formulae:

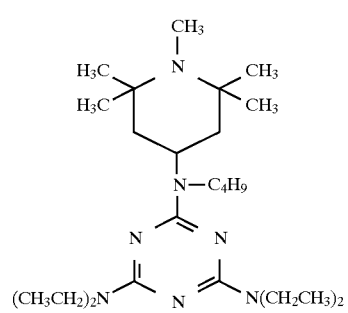

71)
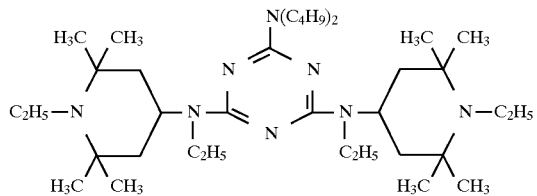
72)
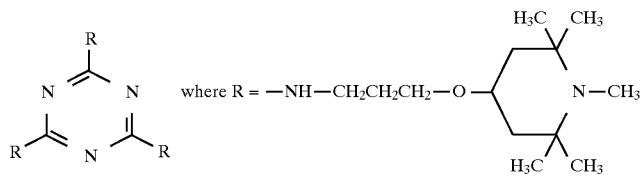
73)
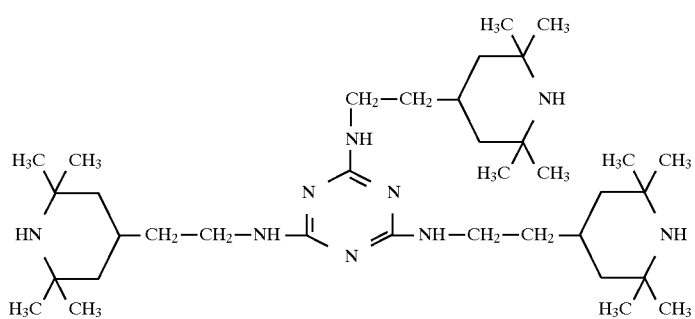
74)
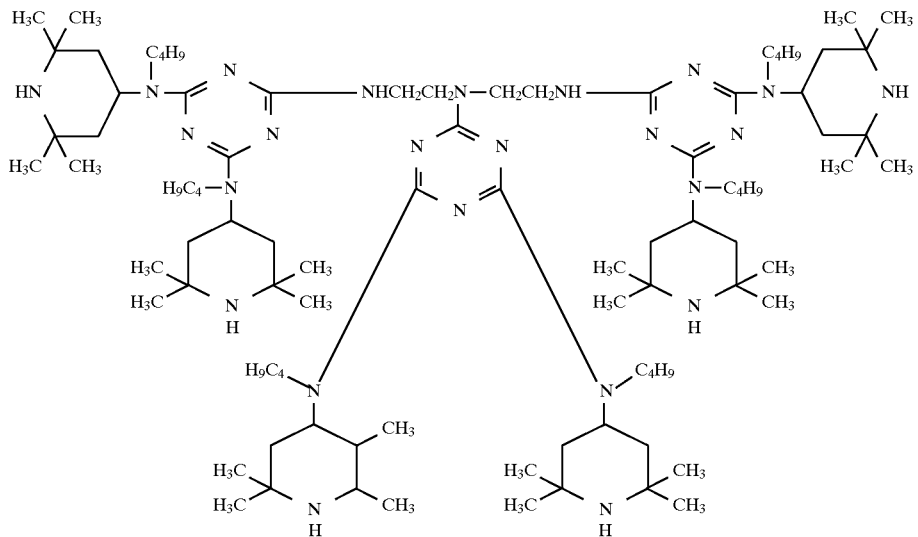

75)
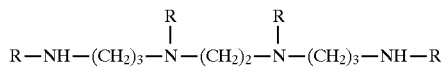
where R is 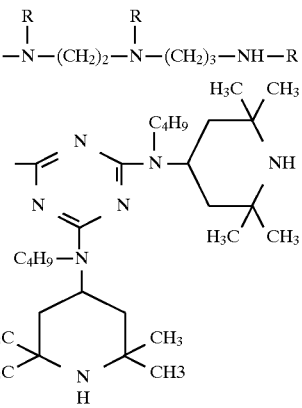
76)
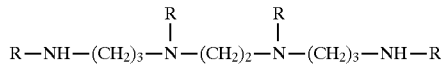
where R is 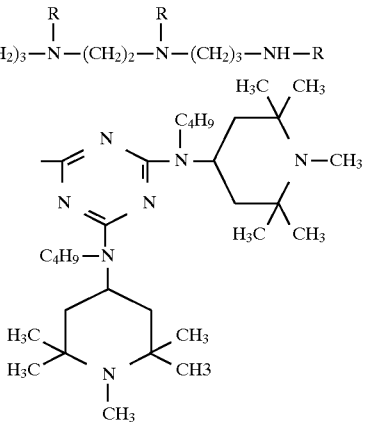
77)
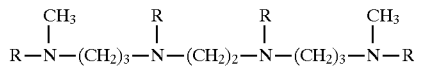
where R is 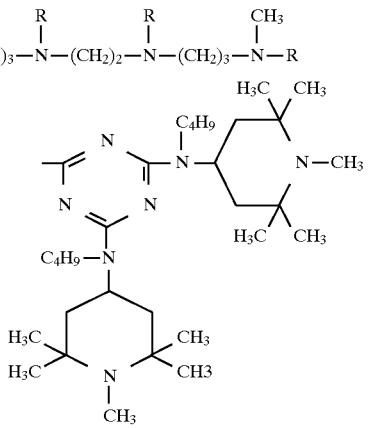

78)

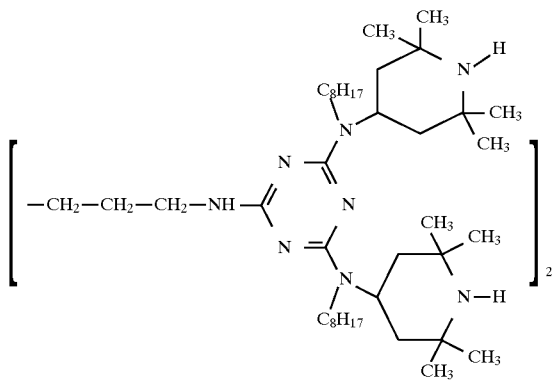

79)

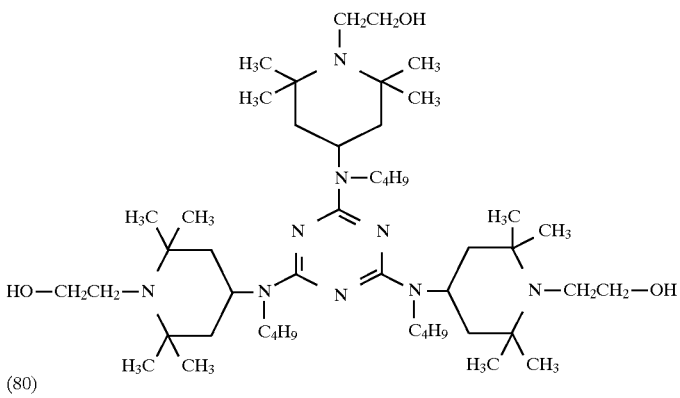

(80)

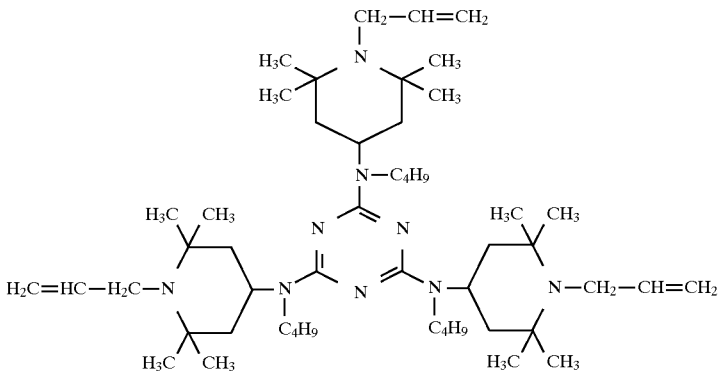

(f) Oligomeric or polymeric compounds whose recurring structural unit contains a 2,2,6,6-tetraalkylpiperidine radical of the formula III, in particular polyesters, polyethers, polyamides, polyamines, polyurethanes, polyureas, polyaminotriazines, poly(meth)acrylates, poly(meth)acrylamides and copolymers thereof containing such radicals.

Examples of 2,2,6,6-polyalkylpiperidine light stabilizers of this class are the compounds of the following formulae, where t is a number from 2 to about 200.

(81)
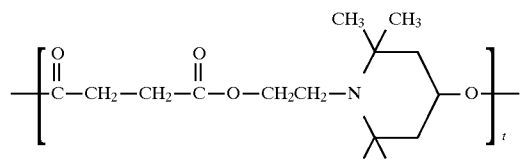
82)
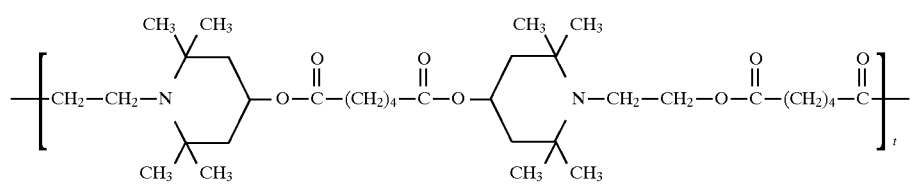
83)
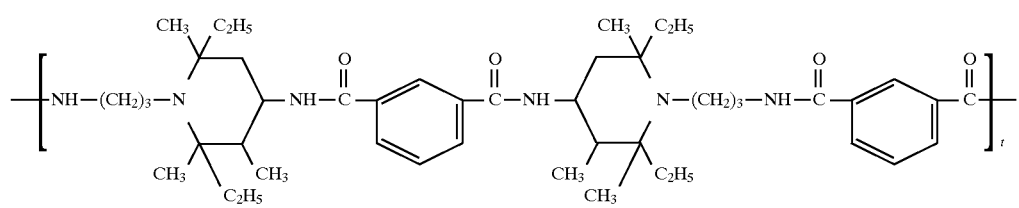
(84)
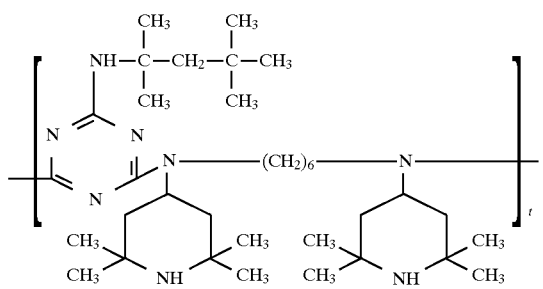
(85)
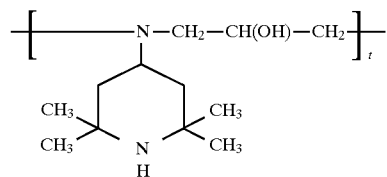
(86)
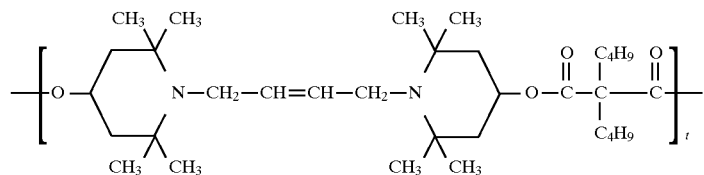

(87)
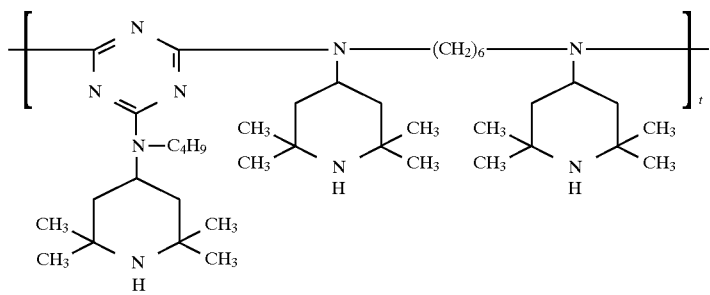
(88)
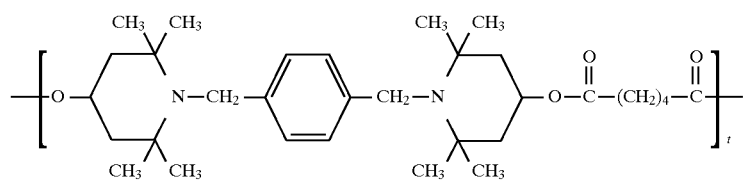
(89)
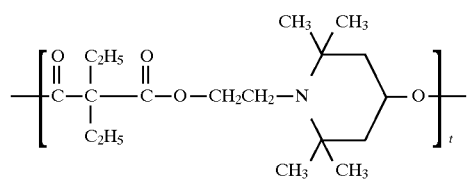
90)
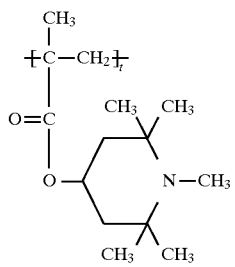
91)
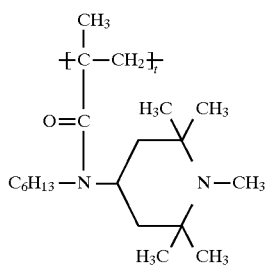

92)

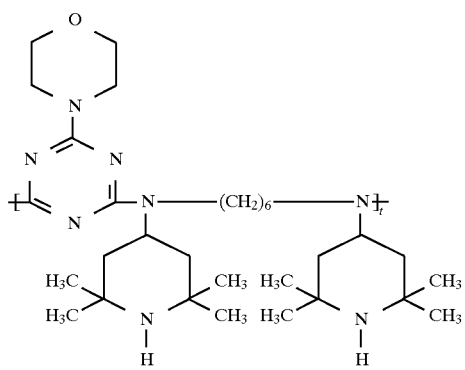

93)

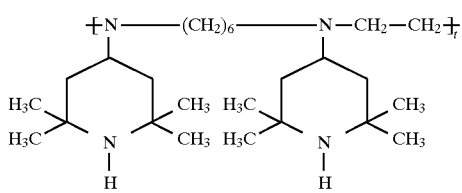

94)

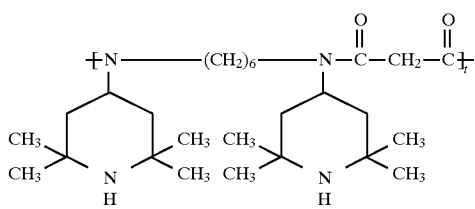

(g) Compounds of the formula IX

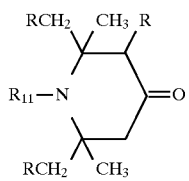

(IX)

in which R and $R_{11}$ are as defined under (a).

Preference is given to compounds of the formula IX in which R is hydrogen or methyl and $R_{11}$ is hydrogen or methyl.

Examples of such compounds are:
95) 2,2,6,6-tetramethyl-4-piperidone (triacetoneamine)
96) 1,2,2,6,6-pentamethyl-4-piperidone
97) 2,2,6,6-tetramethyl-4-piperidone 1-oxide
98) 2,3,6-trimethyl-2,6-diethyl-4-piperidone It is particularly expedient to employ in the novel compositions cyclic sterically hindered amines containing no ester groups, preferably those having at least one triazinyl ring in the molecule. Such amines preferably contain at least one group of the formula III and particularly preferably belong to one of types (a) to (g) illustrated above.

The sterically hindered amines can be used in an amount of, for example, from 0.001 to 5 parts by weight, preferably from 0.01 to 3 parts by weight, particularly preferably from 0.01 to 2 parts by weight, based on 100 parts by weight of PVC.

Component (d):

The term lanthanoid or rare-earth compound is taken to mean, in particular, compounds of the elements cerium, praseodymium, neodymium, samarium, europium, gadolinium, terbium, dysprosium, holmium, erbium, thulium, ytterbium, lutetium, lanthanum, scandium and yttrium (scandium and yttrium are included amongst the lanthanoids here), preference being given to mixtures, in particular with cerium. Further preferred rare-earth compounds are given in EP-A-0 108 023. Regarding suitable and preferred aluminium compounds, further information is given in U.S. Pat. No. 4,060,512 and U.S. Pat. No. 3,243,394.

Compounds of zinc, aluminium or lanthanoids are primarily taken to mean metal soaps.

Metal soaps are principally metal carboxylates, preferably of long-chain carboxylic acids. Common examples are stearates and laurates, but also oleates and salts of relatively short-chain alkylcarboxylic acids. Metal soaps also include alkylbenzoic acids. Metal soaps can be employed individually or as mixtures. A review of common metal soaps is given in Ullmann's Encyclopedia of Industrial Chemistry, 5th Ed., Vol. A16 (1985), pp. 361 ff.).

Preference is given to organic metal soaps from the series consisting of aliphatic saturated $C_2$–$C_{22}$ carboxylates, aliphatic unsaturated $C_3$–$C_{22}$ carboxylates, aliphatic $C_2$–$C_{22}$ carboxylates which are substituted by at least one OH group, cyclic and bicyclic carboxylates having 5–22 carbon atoms, unsubstituted, at least mono-OH-substituted and/or $C_1$–$C_{16}$ alkyl-substituted phenylcarboxylates, unsubstituted, at least mono-OH-substituted and/or $C_1$–$C_{16}$alkyl-substituted naphthylcarboxylates, phenyl-$C_1$–$C_{16}$alkylcarboxylates, naphthyl-$C_1$–$C_{16}$alkylcarboxylates or unsubstituted or $C_1$–$C_{12}$alkyl-substituted phenolates, tallates and rosinates.

Specific mention may be made by way of example of zinc, aluminium, scandium, yttrium and lanthanoid salts of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, isostearic acid, stearic acid, 12-hydroxystearic acid, behenic acid, benzoic acid, p-tert-butylbenzoic acid, dimethylhydroxybenzoic acid, 3,5-di-tert-butyl-4-hydroxybenzoic acid, tolic acid, dimethylbenzoic acid, ethylbenzoic acid, n-propylbenzoic acid, salicylic acid, p-tert-octylsalicylic acid and sorbic acid; zinc, aluminium and lanthanoid salts of monoesters of divalent carboxylic acids, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, phthalic acid, isophthalic acid, terephthalic acid and hydroxyphthalic acid; and di- or triesters of tri- or tetravalent carboxylic acids, such as hemimellitic acid, trimellitic acid, pyromellitic acid and citric acid.

Preference is given to zinc, aluminium and lanthanoid carboxylates of carboxylic acids having 7 to 18 carbon atoms (metal soaps in the stricter sense), for example benzoates or alkanoates, preferably stearates, oleates, laurates, palmitates, behenates, hydroxystearates, dihydroxystearates or 2-ethylhexanoates. Particular preference is given to stearates, oleates and p-tert-butylbenzoates. Superbasic carboxylates, such as superbasic zinc octanoate, are also preferred.

It is also possible to use a mixture of carboxylates having different structures.

It is also possible to employ a mixture of zinc compounds, aluminium compounds and/or lanthanoid compounds having different structures. Organic zinc, aluminium or lanthanoid compounds can also be coated onto an alumo salt compound; cf. also DE-A-4 031 818.

The metal soaps or mixtures thereof can be used in an amount of, for example, from 0.001 to 10 parts by weight, preferably from 0.01 to 8 parts by weight, particularly preferably from 0.05 to 5 parts by weight, based on 100 parts by weight of PVC. The same applies to the other metal stabilizers described below.

Further additives for stabilization of the PVC mixtures may be expedient. These are, for example, plasticizers, metal soaps, further metal stabilizers (in particular organotin stabilizers), fillers and reinforcing materials (for example calcium carbonate, silicates, glass fibres, talc, kaolin, chalk, mica, metal oxides and hydroxides, carbon black or graphite), polyols, organic phosphites, antioxidants, 1,3-diketo compounds, further, metal-free stabilizers [such as β-naphthol, β-aminocrotonates (for example as mentioned in EP 0 465 405, p. 6, lines 9–14), phenylindoles, pyrroles, as described, for example, in EP-A-465 405, and hydroxydiphenylamines], light stabilizers, UV absorbers, lubricants, fatty acid esters, paraffins, blowing agents, optical brighteners, pigments, flameproofing agents, antistatics, phosphates, thiophosphates, gelling aids, peroxide scavengers, modifiers, perchlorates, epoxides and further complexing agents for Lewis acids.

Epoxide compounds

The epoxide compounds (c) which can be used for the purposes of the invention can have an aliphatic, aromatic, cycloaliphatic, araliphatic or heterocyclic structure; they contain epoxide groups as side groups. The epoxide groups are preferably bonded to the remainder of the molecule as glycidyl groups via ether or ester bonds, or they are N-glycidyl derivatives of heterocyclic amines, amides or imides. Epoxide compounds of these types are known in general terms and are commercially available.

The epoxide compounds contain at least one epoxide radical of the formula I

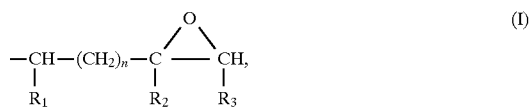

where $R_1$ and $R_3$ are both hydrogen, $R_2$ is hydrogen or methyl, and n is 0, or in which $R_1$ and $R_3$ together are —$CH_2$—$CH_2$— or —$CH_2$—$CH_2$—$CH_2$—, $R_2$ is then hydrogen, and n is 0 or 1 and this epoxide radical is bonded directly to carbon, oxygen, nitrogen or sulfur atoms.

Examples which may be mentioned of epoxide compounds are:

I) Glycidyl and β-methylglycidyl esters obtainable by reacting a compound containing at least one carboxyl group in the molecule and epichlorohydrin or glycerol dichlorohydrin or β-methylepichlorohydrin. The reaction is preferably carried out in the presence of bases.

The compounds containing at least one carboxyl group in the molecule can be aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid and pelargonic acid, and the acids mentioned in the case of the organic zinc compounds.

However, it is also possible to employ cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, for example benzoic acid, phthalic acid, isophthalic acid, trimellitic acid or pyromellitic acid.

It is likewise possible to use carboxyl-terminated adducts, for example of trimellitic acid and polyols, for example glycerol or 2,2-bis(4-hydroxycyclohexyl)propane.

Other epoxide compounds which can be used for the purposes of the present invention are given in EP 0 506 617.

II) Glycidyl or β-methylglycidyl ethers obtainable by reacting a compound containing at least one free alcoholic hydroxyl group and/or phenolic hydroxyl group and a suitably substituted epichlorohydrin under alkaline conditions, or in the presence of an acid catalyst followed by alkali treatment.

Ethers of this type are derived, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol and from monofunctional alcohols such as isooctanol, 2-ethylhexanol, isodecanol and $C_7$–$C_9$alkanol and $C_9$–$C_{11}$alkanol mixtures.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis (hydroxymethyl)cyclohex-3-ene, or they contain aromatic rings, such as N,N-bis(2-hydroxyethyl)aniline or p,p'-bis(2-hydroxyethylamino)diphenylmethane.

The epoxide compounds can also be derived from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone or on condensation products of phenols with formaldehyde obtained under acid conditions, such as phenol novolaks.

Examples of other possible epoxides are: glycidyl 1-naphthyl ether, glycidyl 2-phenylphenyl ether, 2-biphenyl glycidyl ether, N-(2,3-epoxypropyl)phthalimide and 2,3-epoxypropyl 4-methoxyphenyl ether.

III) N-Glycidyl compounds obtainable by dehydrochlorinating the products of the reaction of epichlorohydrin with amines, which contain at least one amino hydrogen atom. These amines are, for example, aniline, N-methylaniline, toluidine, n-butylamine, bis(4-aminophenyl)methane, m-xylylenediamine or bis(4-methylaminophenyl) methane, but also N,N,O-triglycidyl-m-aminophenol or N,N,O-triglycidyl-p-aminophenol.

However, the N-glycidyl compounds also include N,N'-di-, N,N',N''-tri- and N,N',N'',N'''-tetraglycidyl derivatives of cycloalkyleneureas, such as ethyleneurea or 1,3-propyleneurea, and N,N'-diglycidyl derivatives of hydantoins, such as of 5,5-dimethylhydantoin or glycol uril and triglycidyl isocyanurate.

IV) S-Glycidyl compounds, for example di-S-glycidyl derivatives derived from dithiols, for example ethane-1,2-dithiol or bis(4-mercaptomethylphenyl) ether.

V) Epoxide compounds containing a radical of the formula I in which $R_1$ and $R_3$ together are —$CH_2$—$CH_2$—, and n is 0, are bis(2,3-epoxycyclopentyl) ether, 2,3-epoxycyclopentyl glycidyl ether or 1,2-bis(2,3-epoxycyclopentoxy)ethane. An example of an epoxy resin containing a radical of the formula I in which $R_1$ and $R_3$ together are —$CH_2$—$CH_2$— and n is 1 is 3'4'-epoxy-6'-methylcyclohexyl)methyl 3,4-epoxy-6-methylcyclohexanecarboxylate.

Examples of suitable terminal epoxides are:

a) liquid bisphenol A diglycidyl ethers, such as ARALDIT®GY 240, ARALDIT®GY 250, ARALDIT®GY 260, ARALDIT®GY 266, ARALDIT®GY 2600, ARALDIT®MY 790;

b) solid bisphenol A diglycidyl ethers, such as ARALDIT®GT 6071, ARALDIT®GT 7071, ARALDIT®GT 7072, ARALDIT®GT 6063, ARALDIT®GT 7203, ARALDIT®GT 6064, ARALDIT®GT 7304, ARALDIT®GT 7004, ARALDIT®GT 6084, ARALDIT®GT 1999, ARALDIT®GT 7077, ARALDIT®GT 6097, ARALDIT®GT 7097, ARALDIT®GT 7008, ARALDIT®GT 6099, ARALDIT®GT 6608, ARALDIT®GT 6609, ARALDIT®GT 6610;

c) liquid bisphenol F diglycidyl ethers, such as ARALDIT®GY 281, ARALDIT®PY 302, ARALDIT®PY 306;

d) solid polyglycidyl ethers of tetraphenylethane, such as CG Epoxy Resin®0163;

e) solid and liquid polyglycidyl ethers of phenol-formaldehyde novolak, such as EPN 1138, EPN 1139, GY 1180, PY 307;

f) solid and liquid polyglycidyl ethers of o-cresol-formaldehyde novolak, such as ECN 1235, ECN 1273, ECN 1280, ECN 1299;

g) liquid glycidyl ethers of alcohols, such as Shell® glycidyl ether 162, ARALDIT®DY 0390, ARALDIT®DY 0391;

h) liquid glycidyl ethers of carboxylic acids, such as Shell®CARDURA®E terephthalates, trimellitates, ARALDIT®PY 284;

i) solid heterocyclic epoxy resins (triglycidyl isocyanurates), such as ARALDIT®PT 810;

j) liquid cycloaliphatic epoxy resins, such as ARALDIT®CY 179;

k) liquid N,N,O-triglycidyl ether of p-aminophenol, such as ARALDIT®MY 0510;

l) tetraglycidyl-4,4'-methylenebenzamine or N,N,N',N'-tetraglycidyldiaminophenylmethane, such as ARALDIT®MY 720, ARALDIT®MY 721, ARA-DLITE® epoxy resins are available from Ciba.

Preference is given to epoxide compounds containing two functional groups. However, it is in principle possible for epoxide compounds containing one, three or more functional groups to be used.

Predominantly employed are epoxide compounds, in particular diglycidyl compounds, having aromatic groups.

If desired, a mixture of different epoxide compounds can also be employed.

Particularly preferred epoxide compounds are diglycidyl ethers based on bisphenols, for example on 2,2-bis(4-hydroxyphenyl)propane (bisphenol A), bis(4-hydroxyphenyl)methane or mixtures of bis(ortho/para-hydroxyphenyl)methane (bisphenol F).

The epoxide compounds can be employed in an amount of preferably at least 0.1 part by weight, for example from 0.1 to 50 parts by weight, preferably from 1 to 30 parts by weight, in particular from 1 to 25 parts by weight, based on 100 parts by weight of PVC.

Antioxidants:

Preferred antioxidants contain phenolic groups and in particular conform to the formula III

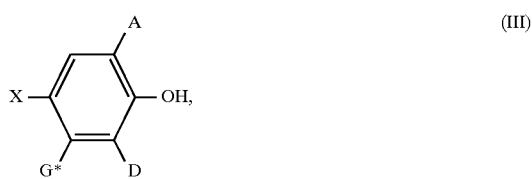

(III)

in which

A is hydrogen, $C_1$–$C_{24}$alcyl, $C_5$–$C_{12}$cycloalkyl, phenyl-$C_1$–$C_4$alkyl, phenyl or —$CH_2$—S—$R'_1$ or

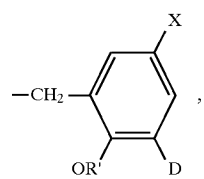

D is $C_1$–$C_{24}$alkyl, $C_5$–$C_{12}$cycloalkyl, phenyl-$C_1$–$C_4$alkyl, phenyl or —$CH_2$—S—$R'_1$, X is hydrogen, $C_1$–$C_{18}$alkyl, —$C_aH_{2a}$—$S_q$—$R'_2$, —$C_bH_{2b}$—CO—$OR'_3$, —$C_bH_{2b}$—CO—N($R'_5$)($R'_6$), —$CH_2$N($R'_{10}$)($R'_{11}$),

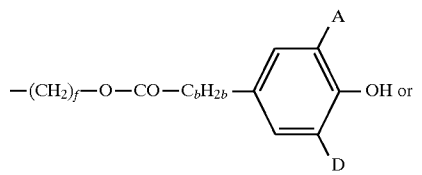

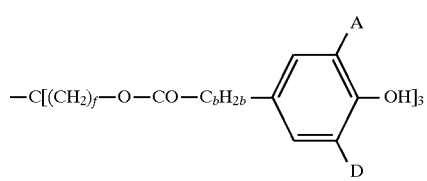

R' is hydrogen or —CO—CH=CH$_2$,

G* is hydrogen or C$_1$–C$_{12}$alkyl,

R'$_1$ is C$_1$–C$_{18}$alkyl, phenyl, —(CH$_2$)$_c$—CO—OR'$_4$ or —CH$_2$CH$_2$OR'$_9$, R'$_2$ is hydrogen, C$_1$–C$_{18}$alkyl, phenyl, benzyl,

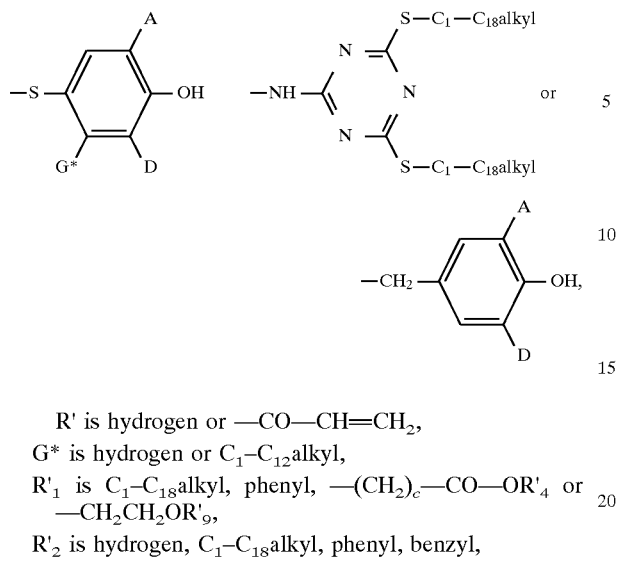

—(CH$_2$)$_c$—CO—OR'$_4$ or —CH$_2$—CH$_2$—OR'$_9$,

R'$_3$ is C$_1$–C$_{30}$alkyl, —CHR'$_7$—CH$_2$—S—R'$_8$,

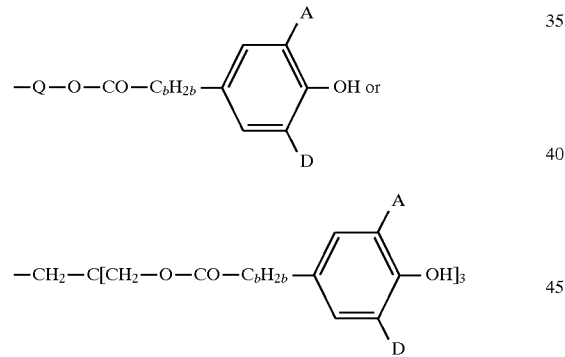

in which Q is C$_2$–C$_8$alkylene, C$_4$–C$_6$thiaalkylene or —CH$_2$CH$_2$(OCH$_2$CH$_2$)$_d$—, R'$_4$ is C$_1$–C$_{24}$alkyl, R'$_5$ is hydrogen, C$_1$–C$_{18}$alkyl or cyclohexyl, R'$_6$ is C$_1$–C$_{18}$alkyl, cyclohexyl, phenyl, C$_1$–C$_{18}$alkyl-substituted phenyl,

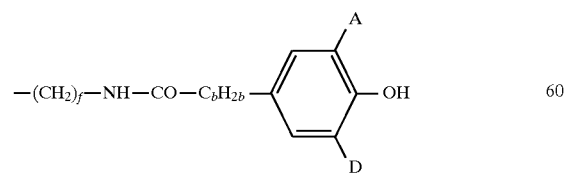

or R'$_5$ and R'$_6$ together are C$_4$–C$_8$alkylene, which may be interrupted by —O— or —NH—, R'$_7$ is hydrogen, C$_1$–C$_4$alkyl or phenyl, R'$_8$ is C$_1$–C$_{18}$alkyl, R'$_9$ is hydrogen, C$_1$–C$_{24}$alkyl, phenyl, C$_2$–C$_{18}$alkanoyl or benzoyl, R'$_{10}$ is C$_1$–C$_{18}$alkyl, cyclohexyl, phenyl, C$_1$–C$_{18}$alkyl-substituted phenyl or

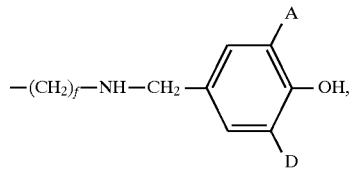

R'$_{11}$ is hydrogen, C$_1$–C$_{18}$alkyl, cyclohexyl or

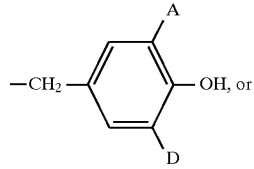

R'$_{10}$ and R'$_{11}$ together are C$_4$–C$_8$alkylene, which may be interrupted by —O— or —NH—, a is 0, 1, 2 or 3, b is 0, 1, 2 or 3, c is 1 or 2, d is 1 to 5, f is 2 to 8 and q is 1, 2, 3 or 4.

Preference is given to a phenolic compound of the formula III in which

A is hydrogen, C$_1$–C$_8$alkyl, cyclohexyl, phenyl, —CH$_2$—S—C$_1$—C$_{18}$alkyl or

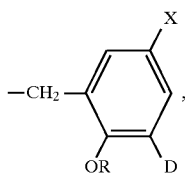

D is $C_1$–$C_8$alkyl, cyclohexyl, phenyl or —$CH_2$—S—$C_1$–$C_{18}$alkyl,

X is hydrogen, $C_1$–$C_8$alkyl, —$C_aH_{2a}$—$S_q$—$R'_2$, —$C_bH_{2b}$—CO—$OR'_3$, —$CH_2N(R'_{10})(R'_{11})$,

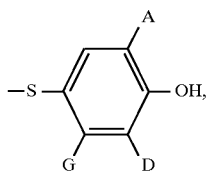

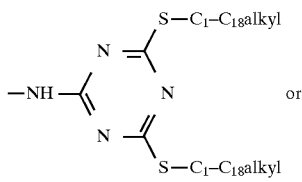

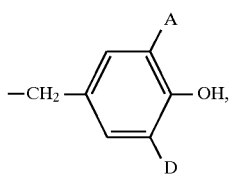

$R'_2$ is $C_1$–$C_{12}$alkyl, phenyl or —$(CH_2)_c$—CO—$OR'_4$, $R'_3$ is $C_1$–$C_{18}$alkyl or

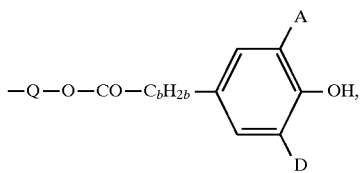

in which Q is $C_2$–$C_8$alkylene, —$CH_2$—$CH_2$—S—$CH_2CH_2$— or —$CH_2CH_2(OCH_2CH_2)_d$—, $R'_4$ is $C_1$–$C_{18}$alkyl, $R'_{10}$ and $R'_{11}$, independently of one another, are hydrogen or $C_1$–$C_{12}$alkyl or $R'_{10}$ and $R'_{11}$ together are $C_4$–$C_8$alkylene, which may be interrupted by —O— or —NH—, a is 1 or 2, b is 1 or 2, c is 1 or 2 and d is 1, 2 or 3.

Particular preference is furthermore given to antioxidants containing at least one group of the formula

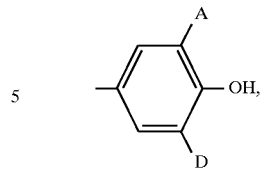

in which A is hydrogen, methyl or tert-butyl, and D is unsubstituted or substituted alkyl or unsubstituted or substituted alkylthioalkyl.

Examples of preferred antioxidants are:
1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butlyphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, octyiphenol, nonylphenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

5. Alkylidenebisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethyidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butly-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(4- hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6. O-, N-and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl) phenyl]2,2-bis(3,5-di-tert-butyl-4-hydroxybenzyl)-malonate.

8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl) isocyanurate.

10. Phosphonates, phosphites and phosphonites, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate, triphenyl phosphite, diphenyl alkyl phosphites, phenyl dialkyl phosphites, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, bisisodecyloxy pentaerythrityl diphosphite, bis(2,4-di-tert-butyl-6-methylphenyl) pentaerythrityl diphosphite, bis(2,4,6-tri-tert-butylphenyl) pentaerythrityl diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl- 12-methyldibenz[d,g]-1, 3,2-dioxaphosphocine, bis(2,4-di-tert-butyl-6-methylphenyl) methyl phosphite, bis(2,4-di-tert-butyl-6-methylphenyl) ethyl phosphite $(C_9H_{19}-C_6H_4-)_{1.5}-P-(O-C_{12-13}H_{25-27})_{1.5}$.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl)propionc acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, dipentaerythritol, tris(hydroxyethyl) isocyanurate, N,N'-bis(hydroxyethyl)oxalamide, 3-thiaundecanol, 3-thiapentadecanol, trimethyihexanediol, trimethylolpropane, ditrimethylolpropane, 4-hydroxymethyl-1-phospha-2,6,7-trioxabicyclo-[2.2.2]-octane.

13. Esters of β-(5-tert-butyl-4-hydroxy-3-methylphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

14. Esters of β-(3,5-dicyclohexyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

15. Esters of 3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

16. Amides of β-(3,5-di-tert-butyl-4-hydroxyphenyl) propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

Of these, particular preference is given to antioxidants from groups 1–5, 10 and 12, in particular 2,2-bis(4-hydroxyphenyl)propane and the esters of 3,5-di-tert-butyl-4-hydroxyphenylpropionic acid with octadecanol or pentaerythritol, or tris(2,4-di-tert-butylphenyl) phosphite.

If desired, a mixture of different antioxidants can also be employed.

The antioxidants can be used in an amount of, for example, 0.01 to 10 parts by weight, preferably from 0.1 to 10 parts by weight, in particular from 0.1 to 5 parts by weight, based on 100 parts by weight of PVC.

Fillers

The fillers used are, for example, chalk, kaolin, china clay, talc, silicates, glass fibres, glass beads, sawdust, mica, metal oxides, metal hydroxides, carbon black, graphite, rock flour and barytes. Preference is given to chalk and talc.

The fillers can be employed in an amount of, preferably, at least 1 part by weight, for example from 5 to 200 parts by weight, preferably from 10 to 150 parts by weight, in particular from 15 to 100 parts by weight, based on 100 parts by weight of PVC.

Examples of suitable plasticizers are those from the following groups:

A) Phthalates (esters of phthalic acid)

Examples of these plasticizers are dimethyl, diethyl, dibutyl, dihexyl, di-2-ethylhexyl, di-n-octyl, di-isooctyl, di-isononyl, di-isodecyl, di-isotridecyl, dicyclohexyl, dimethylcyclohexyl, dimethyl glycol, dibutyl glycol, benzyl butyl and diphenyl phthalates, and mixtures of phthalates, such as $C_7$–$C_9$- and $C_9$–$C_{11}$alkyl phthalates made from predominantly linear alcohols, $C_6$–$C_{10}$-n-alkyl phthalates and $C_8$–$C_{10}$-n-alkyl phthalates.

Preference is given to dibutyl, dihexyl, di-2-ethylhexyl, di-n-octyl, di-isooctyl, di-isononyl, di-isodecyl, di-isotridecyl and benzyl butyl phthalates, and said mixtures of alkyl phthalates. Particular preference is given to di-2-ethylhexyl, di-isononyl and di-isodecyl phthalate.

B) Esters of aliphatic dicarboxylic acids, in particular esters of adipic, azelaic and sebacic acids Examples of these plasticizers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellitate, tri-isooctyl trimellitate (mixture) and tri-$C_6$–$C_8$alkyl, tri-$C_6$–$C_{10}$alkyl, tri-$C_7$–$C_9$alkyl and tri-$C_9$–$C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures.

D) Epoxide plasticizers

These are principally epoxidized unsaturated fatty acids, for example epoxidized soybean oil.

E) Polymer plasticizers

A definition of these plasticizers and examples thereof are given in the handbook "Plastics Additives", edited by R. Gächter and H. Müller, Hanser Verlag, 1985, page 393, chapter 5.9.6, and in "PVC Technology", edited by W. V. Titow, 4th Ed., Elsevier Publ., 1984, pages 165–170. The most usual starting materials for the preparation of polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7$–$C_9$alkanol and $C_9$–$C_{11}$alkanol mixtures. Particularly advantageous are polyester plasticizers made from said dicarboxylic acids and monofunctional alcohols.

F) Esters of phosphoric acid

A definition of these esters is given in the above-mentioned "Plastics Additives Handbook" on page 271, chapter 5.7.2. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and ®Reofos 50 and 95.

G) Chlorinated hydrocarbons (paraffins)

H) Hydrocarbons

I) Monoesters, for example butyl oleate, phenoxyethyl oleate, tetrahydrofurfuryl oleate and esters of alkylsulfonic acids.

J) Glycol esters, for example diglycol benzoates.

Definitions and examples of plasticizers from groups G) to J) are given in the following handbooks:

"Plastics Additives", edited by R. Gächter and H. Müller, Hanser Publishers, 1985, chapter 5.9.14.2 (Group G)) and chapter 5.9.14.1 (Group H)).

"PVC Technology", edited by W. V. Titow, 4th Ed., Elsevier Publishers, 1984, pages 171–173, chapter 6.10.2 (Group G)), page 174, chapter 6.10.5 (group H)), page 173, chapter 6.10.3 (group I)) and pages 173–174, chapter 6.10.4 (group J)).

Particular preference is given to plasticizers from groups A) to G), in particular A) to F), especially the plasticizers in these groups which have been mentioned as preferred.

In general, from 5 to 120 parts, in particular from 10 to 100 parts, of the plasticizers from groups A), B), C) and E), from 0.5 to 30 parts, in particular from 0.5 to 20 parts, of those from group D) and from 1 to 100 parts, in particular from 2 to 80 parts, of those from groups F) and G) are present.

It is also possible to use mixtures of different plasticizers.

The plasticizers can be used in an amount of, for example, from 5 to 120 parts by weight, preferably from 10 to 100 parts by weight, in particular from 20 to 70 parts by weight, based on 100 parts by weight of PVC.

Other metal stabilizers

Specific mention may be made of organotin stabilizers. These are, in particular, carboxylates, mercaptides and sulfides. Suitable compounds are described in U.S. Pat. No. 4,743,640 (columns 3–5).

1,3-Diketones 1,3-Dicarbonyl compounds which can be used can be linear or cyclic dicarbonyl compounds. Preference is given to dicarbonyl compounds of the formula

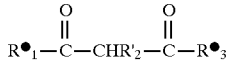

$$R^\bullet_1-\underset{\underset{O}{\|}}{C}-CHR'_2-\underset{\underset{O}{\|}}{C}-R^\bullet_3$$

in which $R^\bullet_1$ is $C_1$–$C_{22}$alkyl, $C_5$–$C_{10}$hydroxyalkyl, $C_2$–$C_{18}$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_5$–$C_{12}$cycloalkyl which is substituted by $C_1$–$C_4$alkyl, or an —$R^\bullet_5$—S—$R^{574}_6$ or —$R^\bullet_5$—O—$R^\bullet_6$ group, $R^\bullet_2$ is hydrogen, $C_1$–$C_8$alkyl, $C_2$–$C_{12}$alkenyl, phenyl, $C_7$–$C_{12}$alkylphenyl, $C_7$–$C_{10}$phenylalkyl or a —CO—$R^\bullet_4$ group, $R^\bullet_3$ has one of the meanings given for $R^\bullet_1$ or is $C_1$–$C_{18}$alkoxy, $R^\bullet_4$ is $C_1$–$C_4$alkyl or phenyl, $R^\bullet_5$ is $C_1$–$C_{10}$alkylene, and $R^\bullet_6$ is $C_1$–$C_{12}$alkyl, phenyl, $C_7$–$C_{18}$alkylphenyl or $C_7$–$C_{10}$phenylalkyl.

These include the hydroxyl-containing diketones of EP-A-346 279 and the oxa- and thiadiketones of EP-A-307 358, and the isocyanuric acid-based diketones of U.S. Pat. No. 4,339,383.

Alkyl $R^\bullet_1$ and $R^\bullet_3$ can be, in particular $C_1$–$C_{18}$alkyl, for example methyl, ethyl, n-propyl, isopropyl, n-butyl, tert-butyl, pentyl, hexyl, heptyl, octyl, decyl, dodecyl or octadecyl.

Hydroxyalkyl $R^\bullet_1$ and $R^\bullet_3$ are, in particular, a —$(CH_2)_n$—OH group, in which n is 5, 6 or 7.

Alkenyl $R^\bullet_1$ and $R^\bullet_3$ can be, for example, vinyl, allyl, methallyl, 1-butenyl, 1-hexenyl or oleyl, preferably allyl.

OH-, alkyl-, alkoxy- or halogen-substituted phenyl $R^\bullet_1$ and $R^\bullet_3$ can be, for example, tolyl, xylyl, tert-butylphenyl, methoxyphenyl, ethoxyphenyl, hydroxyphenyl, chlorophenyl or dichlorophenyl.

Phenylalkyl $R^\bullet_1$ and $R^\bullet_3$ are, in particular, benzyl. Cycloalkyl or alkylcycloalkyl $R^\bullet_2$ and $R^\bullet_3$ are, in particular, cyclohexyl or methylcyclohexyl.

Alkyl $R^\bullet_2$ can be, in particular, $C_1$–$C_4$alkyl. $C_2$–$C_{12}$alkenyl $R^\bullet_2$ can be, in particular, allyl. Alkylphenyl $R^\bullet_2$ can be, in particular, tolyl. Phenylalkyl $R^\bullet_2$ can be, in particular, benzyl. $R^\bullet_2$ is preferably hydrogen. Alkoxy $R^\bullet_3$ can be, for example, methoxy, ethoxy, butoxy, hexyloxy, octyloxy, dodecyloxy, tridecyloxy, tetradecyloxy or octadecyloxy. $C_1$–$C_{10}$alkylene $R^\bullet_5$ is, in particular, $C_2$–$C_4$alkylene. Alkyl $R^\bullet_6$ is, in particular, $C_4$–$C_{12}$alkyl, for example butyl, hexyl, octyl, decyl or dodecyl. Alkylphenyl $R^\bullet_6$ is, in particular, tolyl. Phenylalkyl $R^\bullet_6$ is, in particular, benzyl.

Examples of 1,3-dicarbonyl compounds of the above formula are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, isooctylbenzoylmethane, 5-hydroxycaproylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl or octadecyl acetoacetate, ethyl, butyl, 2-ethylhexyl, dodecyl or octadecyl benzoylacetate, ethyl, propyl, butyl, hexyl or octyl stearoyl acetate and dehydracetic acid, and the zinc or magnesium salts thereof.

Preference is given to 1,3-diketo compounds of the above formula in which $R^\bullet_1$ is $C_1$–$C_{18}$alkyl, phenyl, phenyl which is substituted by OH, methyl or methoxy, $C_7$–$C_{10}$phenylalkyl or cyclohexyl, $R^\bullet_2$ is hydrogen, and $R^\bullet_3$ has one of the meanings given for $R^\bullet_1$.

The 1,3-diketo compounds can be used in an amount of, for example, from 0.01 to 10 parts by weight, preferably from 0.01 to 3 parts by weight, in particular from 0.01 to 2 parts by weight, based on 100 parts of weight of PVC.

Perchlorates or perchloric acid of the formula $M(ClO_4)n$, where M is $H^+$, $NH_4^+$, $Na^+$, $K^+$, $Mg^{2+}$, $Ca^{2+}$, $Ba^{2+}$ or $Al^{3+}$, can likewise be added. The index n is 1, 2 or 3, corresponding to the valence of M.

Perchloric acid or the particular perchlorate can be employed in various customary forms, for example as a salt or an aqueous solution coated onto a support material, such as PVC, calcium silicate, zeolites or hydrotalcites, or bonded into a hydrotalcite by chemical reaction.

The perchlorates can be used in an amount of, for example, from 0.001 to 5 parts by weight, preferably from 0.01 to 3 parts by weight, particularly preferably from 0.01 to 2 parts by weight, based on 100 parts by weight of PVC. Examples of suitable UV absorbers and light stabilizers are:

1.2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl) benzotriazole, 2-(3',5'-di-tert-amyl-2'-hydroxyphenyl) benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2-hydroxy-5 '-(2-isooctyloxycarbonylethyl) phenylbenzotriazole, 2,2'-methylenebis[4-( 1,1,3,3-tetramethylbutyl)-6-benzotriazol-2-yl phenol]; transesterification product of 2-[3'-tert-butyl-5'-(2-methoxycarbonylethyl)-2'-hydroxyphenyl]benzotriazole with polyethylene glycol 300; [R—$CH_2CH_2$—COO $(CH_2)_3]_2$ where R=3'-tert-butyl-4'-hydroxy-5'-2H-benzotriazol-2-yl phenyl.

2.2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl) oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

7.2-(2-Hydroxyphenyl)-1,3,5-triazines, for example 2,4, 6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine.

Examples of suitable peroxide scavengers are: esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate and ethylene glycol bismercaptoacetate.

Examples of suitable lubricants are:
montan wax, fatty acid esters, PE waxes, amide waxes, chlorinated paraffins, glycerol esters and alkaline earth metal soaps. Lubricants which can be used are also described in "Plastics Additives", edited by R. Gächter and H. Müller, Hanser Verlag, 3rd Edition, 1990, pages 466–470. If calcium soaps are used, they can be employed in the usual amounts for lubricants, preferably less than 0.3 part, particularly preferably less than 0.2 part, per 100 parts of PVC.

Examples of other metal-free stabilizers which can be used are β-naphthol, hydroxydiphenylamine, β-aminocrotonates (for example as mentioned in EP 0 465 405, p. 6, lines 9–14), phenylindoles, pyrroles, as described, for example, in EP-A-465 405, and hydroxydiphenylamines.

Examples of suitable polyols are:
pentaerythritol, dipentaerythritol, tripentaerythritol, bistrimethylolpropane, bistrimethylolethane, trismethylolpropane, sorbitol, lycasin, mannitol, lactose, tris (hydroxyethyl) isocyanurate, tetramethylolcyclohexanol, tetramethylolcyclopentanol, tetramethylolcyclopyranol, glycerol, diglycerol and polyglycerol.

The polyols can be used in an amount of, for example, from 0.01 to 20 parts by weight, preferably from 0.1 to 20 parts by weight, in particular from 0.1 to 10 parts by weight, based on 100 parts by weight of PVC.

Suitable organic phosphites are those of the general formula $P(OR)_3$, where the radicals R are identical or different alkyl, alkenyl, aryl or aralkyl radicals. Preferred organic phosphites are those of the formulae

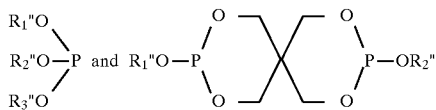

in which $R_1''$, $R_2''$ and $R_3''$ are identical or different and are $C_6$–$C_{18}$alkyl, $C_6$–$C_{18}$alkenyl, substituted or unsubstituted phenyl or $C_5$–$C_7$cycloalkyl.

$C_6$–$C_{18}$alkyl $R_1''$, $R_2''$ and $R_3''$ are, for example, n-hexyl, n-octyl, n-nonyl, decyl, dodecyl, tetradecyl, hexadecyl or octadecyl. Preference is given to alkyl groups having 8 to 18 carbon atoms.

Substituted phenyl $R_1''$, $R_2''$ and $R_3''$ are, for example, tolyl, ethylphenyl, xylyl, cumyl, cymyl, cresyl, 4-methoxyphenyl, 2,4-dimethoxyphenyl, ethoxyphenyl, butoxyphenyl, p-n-octylphenyl, p-n-nonylphenyl or p-n-dodecylphenyl.

Particularly suitable phosphites are trioctyl, tridecyl, tridodecyl, tritetradecyl, tristearyl, trioleyl, triphenyl, tricresyl, tris-p-nonylphenyl and tricyclohexyl phosphites, and particular preference is given to aryl dialkyl phosphites and alkyl diaryl phosphites, for example phenyl didecyl, 2,4-di-tert-butylphenyl didodecyl and 2,6-di-tert-butylphenyl didodecyl phosphites and dialkyl and diaryl pentaerythrityl diphosphites, such as distearyl pentaerythrityl diphosphite, and non-stoichiometric triaryl phosphites, for example of the composition $(H_{19}C_9\text{—}C_6H_4)O_{1.5}P(OC_{12,13}H_{25,27})_{1.5}$.

Preferred organic phosphites are distearyl pentaerythrityl diphosphite, trisnonylphenyl phosphite and phenyl didecyl phosphite.

The organic phosphites can be used in an amount of, for example, from 0.01 to 10 parts by weight, preferably from 0.05 to 5 parts by weight, in particular from 0.1 to 3 parts by weight, based on 100 parts by weight of PVC.

Preference is given to a composition comprising PVC, polyDHP, a compound from the group consisting of hydrotalcite, zeolite, dawsonite, magadiite, kenyaite, disaccharide alcohol and sterically hindered amine, and a zinc soap.

Preference is given to compositions comprising (a) PVC, (b) 0.001–5 parts of polyDHP per 100 parts of PVC, (c) 0.1–20 parts of a hydrotalcite, zeolite, dawsonite, magadiite, kenyaite or disaccharide alcohol or from 0.01 to 5 parts of a hindered amine, in each case per 100 parts of PVC, and (d) 0.01–10.0 parts of a zinc soap, per 100 parts of PVC.

Preference is furthermore given to a PVC composition comprising components (a), (b), (c) and (d) described at the outset and in addition at least one substance from the group consisting of plasticizers, fillers and reinforcing materials, antioxidants, metal soaps, further metal stabilizers, polyols, organic phosphites, 1,3-diketo compounds, light stabilizers, UV absorbers, lubricants, fatty acid esters, paraffins, flowing agents, optical brighteners, pigments, flameproofing agents, antistatics, β-aminocrotonates, perchlorates, epoxides, pyrroles, naphthols, hydroxydiphenylamines, phenylindoles, phosphates, thiophosphates, gelling aids, peroxide scavengers, modifiers and further complexing agents for Lewis acids.

Preference is furthermore given to a PVC composition which additionally comprises a 1,3-diketo compound, in particular in an amount of from 0.01 to 10 parts per 100 parts of PVC.

Preference is furthermore given to a PVC composition which additionally comprises a polyol, preferably trishydroxyethyl isocyanurate (THEIC), in particular in an amount of from 0.01 to 20 parts per 100 parts of PVC.

Preference is furthermore given to a PVC composition which additionally comprises at least one additive from the group consisting of organic phosphites, metal-free stabilizers (such as β-aminocrotonate, pyrroles, hydroxydiphenylamines and β-naphthol), polyols and 1,3-diketones.

Preference is furthermore given to a PVC composition which additionally comprises an organic phosphite, in particular in an amount of from 0.01 to 5 parts per 100 parts of PVC.

Preference is furthermore given to a PVC composition which additionally comprises an antioxidant.

Particular preference is given to a PVC composition which additionally comprises a calcium and/or zinc soap, a polyol and a β-diketone.

Particular preference is also given to a PVC composition which additionally comprises a filler.

The present invention furthermore relates to a stabilizer combination comprising polyDHP of the formula I, as described at the outset, a substance from the group consisting of (i) crystalline hydrotalcites, (ii) crystalline or amorphous zeolites, (iii) crystalline or amorphous dawsonites, magadiites or kenyaites, (iv) disaccharide alcohols and (v) sterically hindered amines containing the structural unit

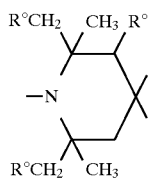

(II)

in which R° is hydrogen or methyl, and
at least one zinc, aluminium or lanthanoid compound, and in particular to the use of such a combination for stabilizing PVC.

The above preferences apply to the individual stabilizers and to the PVC itself, and in addition one of the above-described further constituents can likewise be used.

The stabilizers can expediently be incorporated by the following methods:

- as an emulsion or dispersion (one possibility is, for example, the form of a pasty mixture. One advantage of the novel combination in this form is in the stability of the paste);
- as a dry mix during mixing of additive components or polymer mixtures;
- by direct addition into the processing apparatus (for example calender, mixer, compounder, extruder and the like) or
- as a solution or melt.

The novel stabilized PVC, which is likewise a subject-matter of the invention, can be prepared in a manner known per se, to which end the novel stabilizer combination and, if desired, further additives are mixed with the PVC using equipment known per se, such as that mentioned above. During this operation, the stabilizers can be added individually or as a mixture or alternatively in the form of a masterbatch.

The invention thus also relates to a process for the preparation of stabilized PVC which comprises mixing components (b) (c) and (d) described above and, if desired, further additives with the PVC using equipment such as calenders, mixers, compounders, extruders and the like.

The PVC stabilized in accordance with the present invention can be converted into the desired shape in a known manner, for example by grinding, calendering, extrusion, injection moulding, sintering or spinning, furthermore by extrusion blow moulding or by the plastisol process. The stabilized PVC can also be converted into foams. If the blowing agent employed is azodicarboxamide, it is advantageous if no 1,3-diketones are additionally used.

The novel PVC is suitable for semirigid and flexible formulations, in particular in the form of flexible formulations for wire sheaths, crash pad films (automobiles) and cable insulations, which is particularly preferred. In the form of semirigid formulations, the novel PVC is particularly suitable for decoration sheeting, foams, agricultural sheeting, tubes, sealing profiles and office films.

In the form of rigid formulations, the PVC stabilized in accordance with the invention is particularly suitable for hollow articles (bottles), packaging films (thermoformable films), blown films, tubes, foams, heavy profiles (window frames), light-wall profiles, building profiles, sidings, fittings, office films and equipment housings (computers and domestic appliances).

Examples of the use of the novel PVC as plastisols are artificial leather, floor coverings, textile coatings, wall coverings, coil coatings and automobile underseal.

Examples of sintered applications of the PVC stabilized in accordance with the invention are slush, slush mould and coil coatings.

The examples below illustrate the invention in greater detail without representing a limitation. Parts and percentages are, as in the remainder of the description, by weight, unless stated otherwise.

Examples:

A PVC composition is prepared by mixing the individual components as shown in the table below (amounts in parts by weight). The constituents are homogenized for 5 minutes at 170° C. in a mixing mill, giving a film with a thickness of 0.3–0.5 mm.

The stability of the samples is determined by means of the following tests:

Long-term milling test

The PVC mixture is milled at a temperature of 180° C. in a mill with a nip width of 0.3 mm, and a sample is taken every 12 minutes and cooled, and its yellowness index (YI) is measured (Table I).

Pressed sheet

Several samples of sheeted-out compound homogenized as above are pressed for 3 minutes at 180° to give a sheet with a thickness of 2 mm; the yellowness index of the latter is measured after cooling (Table I).

TABLE I

| Long-term milling test/yellowness index of pressed sheet | |
|---|---|
| Mixture | Example 1 |
| PVC K value 50 | 100 |
| LOXIOL ® G15[1] | 1 |
| Wax AC 316[2] | 0.2 |
| PARALOID ® BTA 736[3] | 10 |
| KANE ® Ace B22[4] | 1 |
| Calcium stearate | 0.3 |
| Zinc stearate | 0.3 |
| Zinc benzoate | 0.15 |
| IRGANOX ® 1076[5] | 0.15 |
| ALKAMIZER ® IV[6] | 0.8 |
| epoxidized soybean oil | 1 |
| Dipentaerythritol | 0.15 |
| SYNESAL ® M[7] | 0.1 |
| RHODIASTAB ® 50[8] | 0.35 |
| YI after 12 minutes | 11 |
| YI after 24 minutes | 13 |
| YI after 36 minutes | 22 |
| YI of the pressed sheet | 24.1 |

[1] Glycerol partial ester;
[2] Ester wax;
[3] Polymethyl methacrylate;
[4] Acrylate polymer as processing aid;
[5] n-Octadecyl 3-[3,5-di-tert-butyl-4-hydroxyphenyl]propionate, phenolic antioxidant from Ciba;
[6] Hydrotalcite from Kyowa (JP);
[7] commercially available polyDHP from Lagor (IT);
[8] Stearoylbenzoylmethane It is found that the novel composition has very good stability.

What is claimed is:

1. A composition comprising
   (a) PVC,
   (b) at least one polyDHP compound of formula I

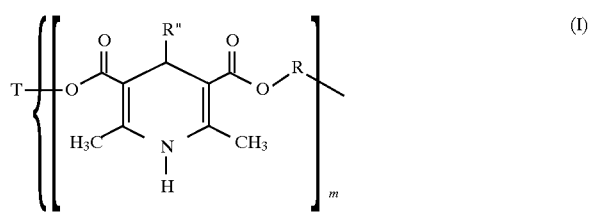

-continued

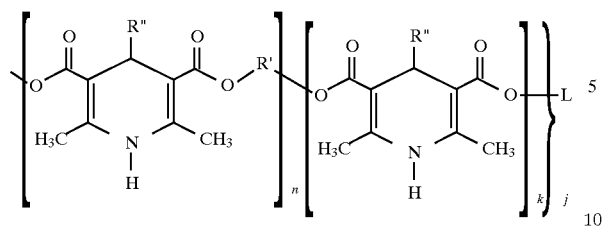

in which T is $C_1$–$C_{22}$alkyl which is unsubstituted or substituted by $C_1$–$C_{18}$alkoxy, $C_1$–$C_{18}$alkylthio, hydroxy, acryloyloxy, methacryloyloxy, halogen, phenyl or naphthyl; or T is $C_5$–$C_{10}$aryl which is unsubstituted or substituted by $C_1$–$C_{18}$alkyl, $C_1$–$C_{18}$alkoxy or halogen; or T is pyrryl, pyridyl, morpholinyl, furyl, thiazolyl or indolyl; or T is $C_3$–$C_{10}$alkenyl, $CH_3$—CO—$CH_2$—CO—OR—, $CH_3$—CO—$CH_2$—COOR'—, $CH_3$—C(NR'''$_2$)=CH—COOR— or $CH_3$—C(NR'''$_2$)=CH—COOR'—, L is as defined for T or is a trivalent or polyvalent radical formed from a straight-chain or branched alkyl group which is unsubstituted or substituted by $C_1$–$C_{12}$alkoxy, $C_1$–$C_{12}$thioalkoxy, $C_6$–$C_{10}$aryl, $C_1$–$C_{12}$carboxyl or hydroxyl, m and n are numbers from 0 to 20, k is 0 or 1, j is a number from 1 to 6 and the conditions j(k+m+n) and m+n>0 are fulfilled, R and R', independently of one another, are methylene or phenylene or an alkylene group of the —(—$C_pH_{2p}$—X—)$_t$$C_pH_{2p}$-type which is unsubstituted or carries substituents from the series consisting of $C_1$–$C_{12}$alkoxy, $C_1$–$C_{12}$thioalkoxy, $C_6$–$C_1$aryl, $C_1$–$C_{12}$carboxyl and hydroxyl, p is from 2 to 18, t is from 0 to 10, X is oxygen or sulfur, or if k is 0 and j>1, R and R', together with L, are a direct bond, R" is hydrogen or $C_6$–$C_{10}$aryl, $C_2$–$C_{18}$alkoxycarbonyl or $C_1$–$C_{18}$alkyl which is unsubstituted or substituted by one or more $C_1$–$C_{12}$alkyl, $C_1$–$C_8$alkoxy, halogen or $NO_2$ substituents, and the two R''' are identical or different and are hydrogen, $C_1$–$C_{18}$alkyl, $C_1$–$C_{18}$hydroxyalkyl or $C_1$–$C_{18}$alkoxyalkyl or together are $C_3$–$C_5$alkylene which is uninterrupted or interrupted by —O—, or are straight-chain or branched $C_2$–$C_{22}$alkenyl, (c) at least one substance from the group consisting of the crystalline hydrotalcites, and (d) at least one zinc compound.

2. A composition according to claim 1, where, in the formula I, T and L, independently of one another, are $C_1$–$C_{18}$alkyl, m, k and j are 1, n is 0, R is —$(CH_2)_2$—, —$(CH_2)_4$— or —$(CH_2)_2$—S—$(CH_2)_2$—, and R" is hydrogen.

3. A composition according to claim 1, where the hydrotalcite conforms to the formula

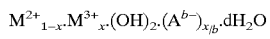 (III)

in which $M^{2+}$ is Mg, Ca, Sr, Zn, Sn and/or Ni, $M^{3+}$ is Al, B or Bi, $A^{b-}$ is an anion having the valence b, b is a number from 1 to 4, x is a number from 0 to 0.5 and d is a number from 0 to 2, or conforms to the fomula

 (IIIa)

in which $M^{2+}$ is at least one metal from the series consisting of Mg and Zn, $A^{b-}$ is an anion from the series consisting of

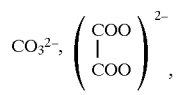

$OH^-$ and $S^{2-}$, where b is the valence of the anion, s is a positive number, preferably from 0.5 to 5, v is from 2 to 6 and z is less than 2.

4. A composition according to claim 1, wherein component d) is a zinc, aluminium or lanthanoid carboxylate.

5. A composition according to claim 1, additionally comprising substances from the group consisting of plasticizers, fillers and reinforcing materials, antioxidants, metal soaps, further metal stabilizers, polyols, organic phosphites, 1,3-diketo compounds, light stabilizers, UV absorbers, lubricants, fatty acid esters, paraffins, blowing agents, optical brighteners, pigments, flameproofing agents, antistatics, β-aminocrotonats, perchlorats, epoxids, pyrroles, naphthols, hydroxydiphenylamines, phenylindoles, phosphates, thiophosphate, gelling aids, peroxide scavengers, modifiers and further complexing agents for Lewis acids.

6. A composition according to claim 1, comprising components (a) and (b), a hydrotalcite as component (c), a zinc soap as component (d), and additionally a plasticizer, a calcium soap, an antioxidant, a 1,3-diketone, a polyol and a lubricant.

7. A composition according to claim 1, comprising (a) PVC, (b) 0.001–5 parts of polyDHP of the formula I per 100 parts of PVC, (c) 0.1–20 parts of a zeolite, dawsonite, magadiite, kenyaite, hydrotalcite or disaccharide alcohol and/or from 0.001 to 5 parts of a sterically hindered amine, in each case per 100 parts of PVC, and (d) 0.001–10 parts of a zinc, aluminium or lanthanoid compound per 100 parts of PVC.

8. A composition according to claim 1, additionally comprising a filler.

9. A composition according to claim 1, additionally comprising at least one additive from the group consisting of metal-free stabilizers, phosphites, polyols or 1,3-diketones.

10. A composition according to claim 1, additionally comprising at least one organic phosphite.

11. A process for the preparation of stabilized PVC, which comprises mixing components (b), (c) and (d) according to claim 1 with the PVC.

* * * * *